(12) United States Patent
Akioka et al.

(10) Patent No.: US 7,514,145 B2
(45) Date of Patent: Apr. 7, 2009

(54) METHOD AND APPARATUS FOR PRODUCING RESIN PARTICLES USING GRANULATION-PREVENTION AGENT, AND RESIN PARTICLES PRODUCED BY THE METHOD

(75) Inventors: Koji Akioka, Nagano (JP); Toshiaki Yamagami, Nagano (JP); Hiroshi Kaiho, Nagano (JP); Ken Ikuma, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 458 days.

(21) Appl. No.: 11/288,993

(22) Filed: Nov. 28, 2005

(65) Prior Publication Data

US 2006/0142425 A1 Jun. 29, 2006

(30) Foreign Application Priority Data

Nov. 26, 2004 (JP) ............................. 2004-342048

(51) Int. Cl.
*B32B 5/16* (2006.01)
*B28B 1/54* (2006.01)

(52) U.S. Cl. .................. 428/402; 428/403; 430/137.11; 430/137.21; 425/6; 425/7; 425/86; 425/90; 425/97

(58) Field of Classification Search ................. 427/201, 427/222; 428/403, 404, 402; 430/137.11, 430/137.21; 425/6, 7, 86, 90, 97
See application file for complete search history.

(56) References Cited

U.S. PATENT DOCUMENTS 7,118,843 B2 * 10/2006 Teshima ................. 430/137.14
2004/0152006 A1 * 8/2004 Teshima ................. 430/109.4

FOREIGN PATENT DOCUMENTS

JP 2004-070303 3/2004

* cited by examiner

*Primary Examiner*—H. (Holly) T Le
(74) *Attorney, Agent, or Firm*—Hogan & Hartson LLP

(57) ABSTRACT

A method for producing resin particles using a dispersion liquid in which a dispersoid mainly made of a resin material is finely dispersed in a dispersion medium, the method comprising a dispersion liquid ejecting step for ejecting the dispersion liquid in the form of droplets and a dispersion medium removing step for removing the dispersion medium from the dispersion liquid in the form of droplets, wherein a granulation prevention agent for preventing or suppressing fine particles derived from the dispersoid from being agglomerated and then granulated is applied to the dispersion liquid.

18 Claims, 7 Drawing Sheets

METHOD AND APPARATUS FOR PRODUCING RESIN PARTICLES USING GRANULATION-PREVENTION AGENT, AND RESIN PARTICLES PRODUCED BY THE METHOD

CROSS-REFERENCE

The entire disclosure of Japanese Patent Application No. 2004-342040 filed on Nov. 26, 2004 is expressly incorporated by reference herein.

BACKGROUND OF THE INVENTION

1. Field of the Invention

The present invention relates to a method for producing resin particles and resin particles produced by the method.

2. Description of the Prior Art

Toners for use in image formation apparatuses employing an electrophotographic system such as printers, copiers, facsimile machines and the like, and powdered paints are formed using fine particles mainly made of a resin material (hereinafter, referred to as "resin particles").

As for one example of a method for producing such resin particles, a method disclosed in JP-A No. 2004-070303 is known. In this method, droplets of a dispersion liquid in which a dispersoid containing a resin material is finely dispersed in a dispersion medium are solidified to thereby obtain resin particles.

In this method, a dispersion liquid in which a dispersoid containing a resin material is finely dispersed in a dispersion medium is ejected from nozzles in the form of droplets and then the dispersion medium is removed from the droplets while conveying the droplets in an air flow to obtain resin particles. In this method, since each of the droplets contains a plurality of fine particles derived from the dispersoid, each of the resin particles to be obtained is composed of an agglomerate of such fine particles derived from the dispersoid.

However, in this method, since each of the resin particles is an agglomerate composed of such fine particles derived from the dispersoid as described above, the resin particles are likely to be broken up between the fine particles, namely the resin particles produced in such a manner have low strength. In order to enhance the strength of the resin particles, there may be an approach in which fine particles derived from the dispersoid are made to be fused and bonded with each other at a high temperature. However, even in the case where such an approach is used, it is still difficult to sufficiently enhance the strength of the resin particles. In addition, the resin particles obtained in this manner may not have desired properties due to undesirable degeneration of the resin constituting the resin particles.

Further, in this method, if the droplets of the dispersion liquid are heated at a relatively high temperature in order to remove the dispersion medium quickly from the droplets to obtain the agglomerates, there is a case that fine particles derived from the dispersoid are bonded unnecessarily with each other before being agglomerated. In such a case, it becomes difficult to remove the dispersion medium from the inside of the droplets, which results in a case that the obtained agglomerates have voids and different shapes. As a result, resin particles formed from such agglomerates also have large variations in their diameters and shapes. In a case where such resin particles are used as a toner, there is a possibility of causing defective charge since toner particles cannot be frictionally charged with each other when forming a toner image. Further, there is also a possibility of causing improper transfer of a toner when electrostatically attaching toner particles to a photoconductive drum. Furthermore, if such resin particles are used for a powdered paint, there is a case that coating detect such as a pinhole, flaking and the like occurs in a paint coating depending on coating conditions.

SUMMARY OF THE INVENTION

It is therefore an object of the present invention to provide a method for producing resin particles by which resin particles having superior mechanical strength and having uniform shape with small particle size distribution can be produced while preventing undesirable degeneration of the resin material constituting the resin particles and to provide resin particles produced by the method.

In order to achieve the above object, the present invention is directed to a method for producing resin particles using a dispersion liquid in which a dispersoid mainly made of a resin material is finely dispersed in a dispersion medium. This method comprises a dispersion liquid ejecting step for ejecting the dispersion liquid in the form of droplets and a dispersion medium removing step for removing the dispersion medium from the dispersion liquid in the form of droplets, wherein a granulation prevention agent for preventing or suppressing fine particles derived from the dispersoid from being agglomerated and then granulated is applied to the dispersion liquid.

According to this method, it is possible for an individual fine particle derived from the dispersoid to form each resin particle in the dispersion medium removing step. Since each of the resin particles obtained in this method is not an agglomerate of fine particles. It has superior mechanical strength. Further, this makes it possible to prevent the formation of resin particles having voids (hollow resin particles) or defective particles, thereby enabling to produce resin particles having a uniform particle shape and a small (narrow) particle size distribution effectively. In addition, since it is unnecessary to fuse the fine particles derived from the dispersoid at a high temperature to enhance mechanical strength, it is possible to prevent undesirable degeneration of the resin material constituting the resin particles.

In the method for producing resin particles according to the present invention, it is preferred that the granulation prevention agent is applied to the dispersion liquid which has been elected in the form of droplets.

This makes it possible for an individual fine particle derived from the dispersoid to form each resin particle in the dispersion medium removing step more reliably.

Further, in the method for producing resin particles according to the present invention, it is also preferred that the granulation prevention agent includes inorganic fine particles.

The inorganic fine particles (that is, the granulation prevention agent) existing between each dispersoid contained in the droplets of the dispersion liquid can prevent the fine particles derived from the dispersoid from directly contacting with each other, whereby enabling to prevent the fine particles from being agglomerated and then granulated.

Further, in the method for producing resin particles according to the present invention, it is also preferred that the inorganic fine particles include fine particles each of which is mainly composed of silica and/or titanium oxide.

By using such inorganic fine particles as a constituent material of the granulation prevention agent, it is possible to prevent adverse effects on the properties of the resin particles to be finally obtained while preventing the fine particles derived from the dispersoid from being agglomerated and then granulated with each other more reliably. Further, in the case where such a granulation prevention agent is collected with resin particles in a state of adhering to the surfaces of the fine particles derived from the dispersoid, the granulation prevention agent can function as a kind of external additives.

Further, in the method for producing resin particles according to the present invention, it is also preferred that when the average particle diameter of the granulation prevention agent is defined as Dc ($\mu$m) and the average particle diameter of the dispersoid is defined as Dm ($\mu$m), Dc and Dm satisfy the relation: $1 \times 10^{-3} \leq Dc/Dm \leq 1 \times 10^{-1}$.

By allowing Dc and Dm to satisfy the above relation, it is possible to prevent effectively the fine particles derived from the dispersoid in the droplets of the dispersion liquid from being agglomerated with each other, thus making it possible for an individual fine particle derived from the dispersoid to form each resin particle more reliably. As a result, it becomes possible to obtain resin particles each having superior mechanical strength and uniform shape.

Further, in the method for producing resin particles according to the present invention. It is also preferred that an average particle diameter of the granulation prevention agent is preferably in the range of 0.02 to 1.0 $\mu$m.

By setting the average particle diameter of the granulation prevention agent to the value within the above range, it is possible to prevent effectively the fine particles derived from the dispersoid in the droplets of the dispersion liquid from being agglomerated with each other, thus making it possible for an individual fine particle derived from the dispersoid to form each resin particle more reliably. As a result, it becomes possible to obtain resin particles each having superior mechanical strength and uniform shape.

Further, in the method for producing resin particles according to the present invention, it is also preferred that when the average particle diameter of the droplets of the ejected dispersion liquid is defined as Dd ($\mu$m) and the average particle diameter of the dispersoid is defined as Dm ($\mu$m). Dd and Dm satisfy the relation; $0.5 < Dm/Dd < 1.0$.

By allowing Dd and Dm to satisfy the above relation, it is possible to prevent each droplet of the ejected dispersion liquid from containing two or more fine particles derived from the dispersoid. As a result, the droplet of the dispersion liquid contains only a single (individual) fine particle derived from the dispersoid in the dispersion medium, or contains no dispersoid and being substantially comprised of only the dispersion medium. This makes it possible to prevent the fine particles derived from the dispersoid from being agglomerated with each other and to obtain resin particles each having superior mechanical strength and uniform shape.

Further, in the method for producing resin particles according to the present invention, it is also preferred that in the dispersion medium removing step, the dispersion liquid is heated at a temperature which is equal to or lower than the glass transition point of the resin material constituting the dispersoid.

This makes it possible to remove the dispersion medium in the dispersion medium removing step while preventing fine particles derived from the dispersoid from being softened, bonded and agglomerated with each other more effectively, thereby allowing the obtained resin particles to have a uniform shape and sufficiently high shape stability. As a result, resin particles having a high degree of sphericity (that is, resin particles having a shape close to a geometrically perfect sphere) are produced relatively easily.

Further, in the method for producing resin particles according to the present invention, it is also preferred that the dispersion liquid is intermittently ejected by the use of a piezoelectric pulse.

This makes it possible to prevent the formation of void particles or defective particles more effectively, thereby enabling to produce resin particles having a uniform particle shape and a small (narrow) particle size distribution effectively.

Further, in the method for producing resin particles according to the present invention, it is also preferred that the resin particles are toner particles.

This makes it possible to enhance mechanical strength of toner particles while preventing undesirable degeneration of the resin material constituting the toner particles, thereby enabling to produce a toner having a uniform particle shape and a small (narrow) particle size distribution. As a result, an extremely high quality image can be obtained due to superior electrification properties and transfer properties of the toner.

Further, in the method for producing resin particles according to the present invention, it is also preferred that the resin particles are resin particles for a powdered paint.

This makes it possible to enhance mechanical strength of a powered paint while preventing undesirable degeneration of a resin material constituting the powdered paint, thereby enabling to produce a powdered paint having a uniform particle shape and a small (narrow) particle size distribution. In particular, the formation of void particles or defective particles can be prevented, thus making it possible to prevent a pinhole or flaking from being generated in a paint coating formed using the powdered paint.

Another aspect of the present invention is directed to resin particles that are produced by the method for producing resin particles according to the present invention as defined in the above.

This makes it possible to enhance mechanical strength of resin particles while preventing undesirable degeneration of a resin constituting the resin particles, thereby enabling to produce resin particles having a uniform particle shape and a small (narrow) particle size distribution.

In the resin particles according to the present invention, it is preferred that the average roundness R of the resin particles which is represented by the following formula (I) is 0.95 or higher:

$$R = L_0 L_1 \qquad (I)$$

wherein $L_1$ ($\mu$m) represents the circumference of a projected image of a resin particle that is a subject of measurement, and $L_0$ ($\mu$m) represents the circumference of a perfect circle (a geometrically perfect circle) having the same area as that of the projected image of the resin particle that is a subject of measurement.

According to this, in a case where the resin particles are used for a toner, variations in electrification properties, fixing properties, etc among toner particles are especially small, thereby further improving the reliability of the toner as a whole.

Further, in the resin particles according to the present invention, it is also preferred that the standard deviation of average roundness among the resin particles is 0.015 or less.

By setting the standard deviation of average roundness among the resin particles to a value within the above range, in a case where the resin particles are used for a toner, variations in electrification properties, fixing properties, etc among toner particles are especially small, thereby further improving the reliability of the toner as a whole.

Further, in the resin particles according to the present invention, it is also preferred that the bulk density of the resin particles is equal to or more than 0.34 g/cm$^3$.

By setting the bulk density of the resin particles to the value within the above range, in a case where the resin particles are used for a toner it is possible to obtain a toner having superior electrification properties and durability. In addition, the amount of the toner to be packed in a cartridge is increased even in a case where the volume of the cartridge is the same as before. Further, such an increased bulk density of the toner is advantageous to the reduction in size of a cartridge.

These and other objects, structures and advantages of the present invention will be apparent from the following detailed description of the invention and the examples thereof which proceeds with reference to the accompanying drawings.

DETAILED DESCRIPTION OF THE INVENTION

Figure 1:
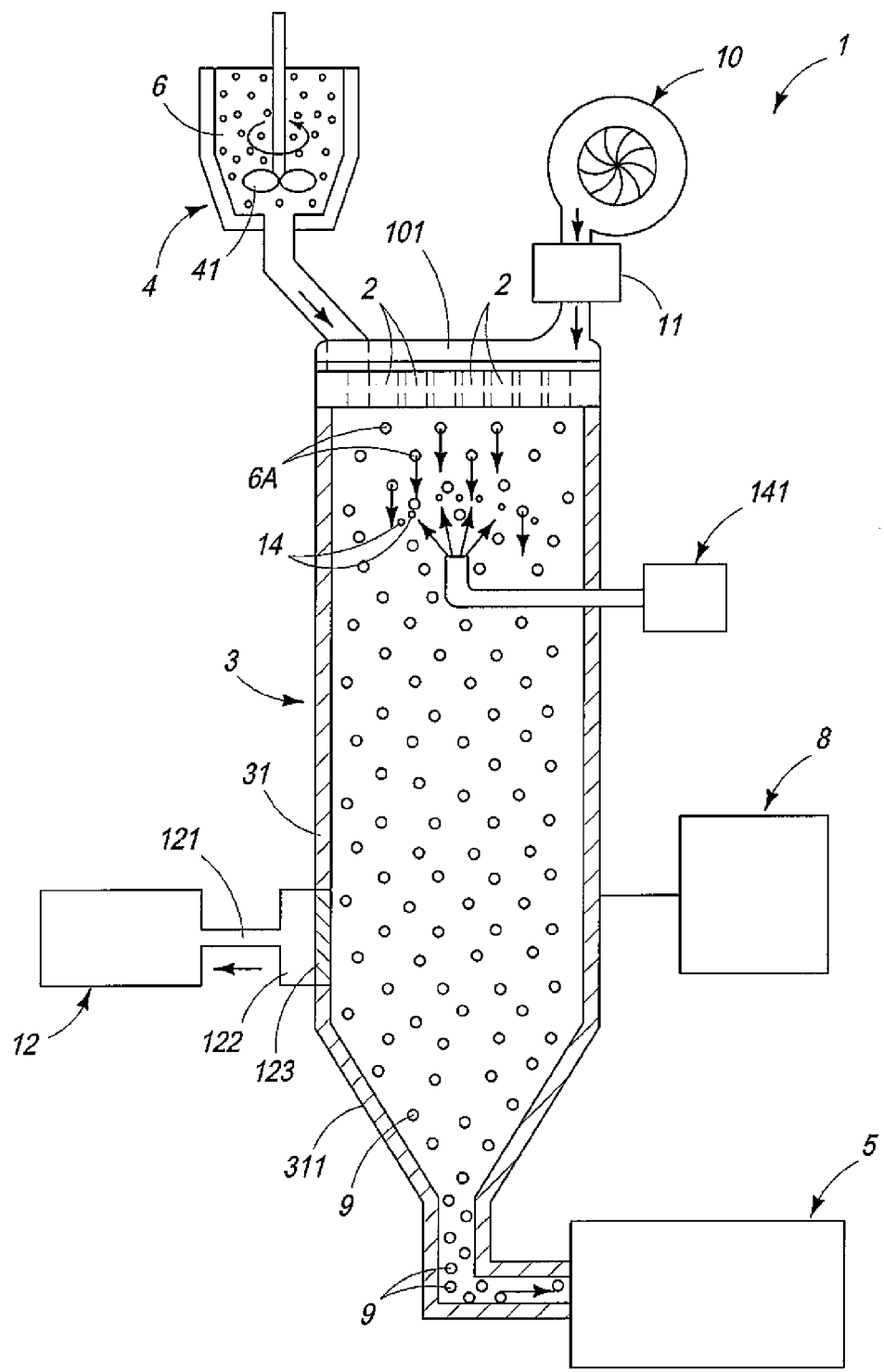
FIG. 1 is a cross-sectional view which schematically shows a first embodiment of an apparatus for use in producing a toner of the present invention.

Hereinbelow, preferred embodiments of a method for producing resin particles and resin particles produced by the resin particle production method according to the present invention will be described in detail with reference to the accompanying drawings.

Resin particles to be produced by the resin particle production method according to the present invention are not particularly limited as long a they are mainly composed of a resin material. However, among various resin particles, the resin particles according to the present invention are preferably used for toner particles of toners used in image formation apparatuses employing an electrophotographic system such as printers, copiers, facsimile machines and the like, because the toner particles are strictly required to have uniformity in size and shape and therefore an effect obtained by application of the present invention is particularly conspicuous. For this reason, toner particles will be described below as an example of various resin particles. In this connection, it is to be noted that the term "resin particles" used in this specification means particles (powders) mainly composed of a resin material, and such resin particles may contain other components in addition to the resin material.

<Dispersion Liquid>

First, a dispersion liquid 6 to be used in the present invention will be described. The resin particles of the present invention are produced using the dispersion liquid 6. In this regard, a description will be made with regard to a case where the resin particles of the present invention are used for a toner. Examples of the dispersion liquid 6 include suspensions and emulsions. In this regard, it is to be noted that the term "suspension" used in this specification means a dispersion liquid in which a solid dispersoid (suspended particles) is dispersed in a liquid dispersion medium (colloidal suspensions are also included). The term "emulsion" used in this specification means a dispersion liquid in which a liquid dispersoid (dispersed particles) is dispersed in a liquid dispersion medium. Further, such a dispersion liquid as described above may contain both a solid dispersoid and a liquid dispersoid. In this case, a dispersion liquid in which a ratio of a solid dispersoid is larger than that of a liquid dispersoid is defined as a suspension, and a dispersion liquid in which a ratio of a liquid dispersoid is larger than that of a solid dispersoid is defined as an emulsion. Particularly, the dispersion liquid to be used in the present invention is preferably subjected to deaeration treatment. Deaeration treatment will be described later in detail.

The dispersion liquid 6 is in a state where a dispersoid (a dispersed phase) 61 is finely dispersed in a dispersion medium 62.

(Dispersion Medium)

The dispersion medium 62 is not particularly limited as long as it can disperse the dispersoid 61 which will be described later, but is preferably one mainly composed of a material generally used as a solvent (hereinafter, also referred to as a "solvent material").

Examples of such a material include inorganic solvents such as water, carbon disulfide, and carbon tetrachloride, and organic solvents such as ketone-based solvents (e.g., methyl ethyl ketone (MEK), acetone, diethyl ketone, methyl isobutyl ketone (MIBK), methyl isopropyl ketone (MIPK), cyclohexanone, 3-heptanone, and 4-heptanone), alcohol-based solvents (e.g., methanol, ethanol, n-propanol, isopropanol, n-butanol, i-butanol, t-butanol, 3-methyl-1-butanol, 1-pentanol, 2-pentanol, n-hexanol, cyclohexanol, 1-heptanol, 1-octanol, 2-octanol, 2-methoxyethanol, allyl alcohol, furfuryl alcohol, and phenol), ether-based solvents (e.g., diethyl ether, dipropyl ether, diisopropyl ether, dibutyl ether, 1,2-dimethoxy ethane (DME), 1,4-dioxane, tetrahydrofuran (THF), tetrahydropyran (THP), anisole, diethylene glycol dimethyl ether (diglyme), and 2-methoxyethanol), cellosolve-based solvents (e.g., methyl cellosolve, ethyl cellosolve, and phenyl cellosolve), aliphatic hydrocarbon-based solvents (e.g., hexane, pentane, heptane, cyclohexane, methylcyclohexane, octane, didecane, methylcyclohexene, and isoprene), aromatic hydrocarbon-based solvents (e.g., toluene, xylene, benzene, ethyl benzene, and naphthalene), aromatic heterocyclic compound-based solvents (e.g., pyridine, pyrazine, furan, pyrrole, thiophene, 2-methylpyridine, 3-methylpyridine, 4-methylpyridine, and furfuryl alcohol), amide-based solvents (e.g., N,N-dimethylformamide (DMF) and N,N-dimethylacetamide (DMA)), halide based solvents (e.g., dichloromethane, chloroform, 1,2-dichloroethane, trichloroethylene, and chlorobenzene), ester-based solvents (e.g., acetylacetone, ethyl acetate, methyl acetate, isopropyl acetate, isobutyl acetate, isopentyl acetate, ethyl chloroacetate, butyl chloroacetate, isobutyl chloroacetate, ethyl formate, isobutyl formate, ethyl acrylate, methyl methacrylate, and ethyl benzoate), amine-based solvents (e.g., trimethylamine, hexylamine, triethylamine, and aniline), nitrile-based solvents (e.g., acrylonitrile and acetonitrile), nitro-based solvents (e.g., nitromethane and nitroethane), and aldehyde based solvents (e.g., acetaldehyde, propionaldehyde, butyraldehyde, pentanal, and acrylaldehyde). These materials can be used singly or in combination of two or more of them.

Among these materials, it is preferred that the dispersion medium 62 is one mainly composed of water and/or a liquid having good compatibility with water (e.g., a liquid having a solubility of 30 g or more per 100 g of water at 25° C.). By using such a dispersion medium 62, it is possible to improve the dispersibility of the dispersoid 61 in the dispersion medium 62 and to allow the dispersoid 61 contained in the dispersion liquid 6 to have a relatively small particle diameter and small variations in particle size. As a result, the finally obtained toner (namely, the resin particles) has small variations in particle size and shape and a high degree of roundness. Particularly, in a case where the dispersion medium 62 is composed or water, substantially no organic solvent is volatilized in a toner production process. Therefore, it is possible to produce a toner in a manner which has almost no adverse effect on the environment, that is, in a manner harmless to the environment.

In a case where the dispersion medium 62 is composed of a mixture of two or more components, it is preferred that at least two components of the mixture form an azeotrope (a minimum boiling point azeotrope) together. This makes it possible to efficiently remove the dispersion medium 62 in a conveying portion 3 of the toner production apparatus 1 which will be described later. In addition to that, it is also possible to remove the dispersion medium 62 at a relatively low temperature in the conveying portion 3 of the toner production apparatus 1, thereby preventing the deterioration of properties of the finally obtained toner (toner particles) more effectively.

In a case where the dispersion medium 62 is composed of a mixture of two or more components, it is preferred that at least two components of the mixture form an azeotrope (a minimum boiling point azeotrope) together. This makes it possible to remove the dispersion medium 62 in a conveying portion 3 of the toner production apparatus 1 which will be described later efficiently. In addition to that, it is also possible to remove the dispersion medium 62 at a relatively low temperature in the conveying portion 3 of the toner production apparatus 1, thereby preventing the deterioration of properties of the finally obtained toner (toner particles) more effectively.

Examples of a liquid which can form an azeotrope with water include carbon disulfide, carbon tetrachloride, methyl ethyl ketone (MEK), acetone, cyclohexanone, 3-heptanone, 4-heptanone, ethanol, n-propanol, isopropanol, n-butanol, i-butanol, t-butanol, 3-methyl 1-butanol, 1-pentanol, 2-pentanol, n-hexanol, cyclohexanol, 1-heptanol, 1-octanol, 2-octanol, 2-methoxyethanol, allyl alcohol, furfuryl alcohol, phenol, dipropyl ether, dibutyl ether, 1,4-dioxane, anisole, 2-methoxyethanol, hexane, heptane, cyclohexane, methylcyclohexane, octane, didecane, methylcyclohexene, isoprene, toluene, benzene, ethyl benzene, naphthalene, pyridine, 2-methylpyridine, 3-methylpyridine, 4-methylpyridine, furfuryl alcohol, chloroform, 1,2-dichloroethane, trichloroethylene, chlorobenzene, acetylacetone, ethyl acetate, methyl acetate, isopropyl acetate, isobutyl acetate, isopentyl acetate, ethyl chloroacetate, butyl chloroacetate, isobutyl chloroacetate, ethyl formate, isobutyl formate, ethyl acrylate, methyl methacrylate, ethyl benzoate, trimethylamine, hexylamine, triethylamine, aniline, acrylonitrile, acetonitrile, nitromethane, nitroethane, and acrylaldehyde.

The boiling point of the dispersion medium 62 is not limited to any specific value, but is preferably 180° C. or less, more preferably 150° C. or less, even more preferably in the range of 35 to 130° C. Such a relatively low boiling point of the dispersion medium 62 makes it possible to remove the dispersion medium 62 in the conveying portion 3 of the toner production apparatus 1 which will be described later relatively easily. In addition to that, it is also possible to reduce the amount of the dispersion medium 62 remaining in the finally obtained toner particles significantly, thereby further improving the reliability of the toner.

It is to be noted that the dispersion medium 62 may contain other components in addition to the above-described material. For example, the dispersion medium 62 may contain various additives such as materials which will be exemplified later as constituent materials of the dispersoid 61. Inorganic powders (e.g., silica, titanium oxide, and iron oxide), and organic powders (e.g., fatty acid and fatty acid metal salts).

Dispersoid

The dispersoid 61 is usually composed of a material containing at least a resin as a main component or a precursor thereof (hereinafter, they are collectively referred to as a "resin material"). Examples of a precursor of a resin include a monomer, a dimer, and an oligomer of the resin.

Hereinbelow, constituent materials of the dispersoid 61 will be described.

1. Resin (Binder Resin)

Examples of resins (binder resins) include (meth) acrylic resins, polycarbonate resins, styrene-based resins (homopolymers or copolymers containing styrene or a styrene substituent) such as polystyrene, poly-α-methylstyrene, chloropolystyrene, styrene-chlorostyrene copolymer, styrene-propylene copolymer, styrene-butadiene copolymer, styrene-vinyl chloride copolymer, styrene-vinyl acetate copolymer, styrene-maleic acid copolymer, styrene-acrylic ester copolymer, styrene-methacrylic ester copolymer, styrene-acrylic ester-methacrylic ester copolymer, styrene-α-methyl chloroacrylate copolymer, styrene-acrylonitrile-acrylic ester copolymer, and styrene-vinyl methyl ether copolymer, polyester resins, epoxy resins, urethane-modified epoxy resins, silicone-modified epoxy resins, vinyl chloride resins, resin-modified maleic acid resins, phenyl resins, polyethylene, polypropylene, ionomer resins, polyurethane resins, silicone resins, ketone resins, ethylene-ethylacrylate copolymer, xylene reins, polyvinyl butyral resins, terpene reins, phenol resins, and aliphatic or alicyclic hydrocarbon resins. These binder resins can be used singly or in combination of two or more of them. In a case where a toner is produced by polymerizing a raw material contained in the dispersoid 61 in the conveying portion 3 of the toner production apparatus 1, a monomer, a dimer, an oligomer, or the like of the above-mentioned resin material is usually used.

In a case where a thermosetting resin is used as a constituent material of the dispersoid 61, it is possible to prevent the formation of defective resin particles effectively, in particular the formation of defective resin particles generated due to adhesion (bonding) between the resin particles 9 in a dispersion medium removing step that will be described later, thus enabling to obtain resin particles having smaller variations in size and shape.

The amount of the resin contained in the dispersoid 61 is not limited to any specific value, but is preferably in the range of 2 to 98 wt %, more preferably in the range of 5 to 95 wt %.

Further, the glass transition point of the resin constituting the dispersoid 61 is preferably in the range of 50 to 70° C. By setting the glass transition point of the resin constituting the dispersoid 61 to a value within the above range, it is possible to obtain appropriate resin particles 9 efficiently in the dispersion medium removing step that will be described later. In this regard, it is to be noted that in a case where the resin material constituting the dispersoid 61 is comprised of two or more kinds of resins (resin components), the glass transition point of a resin (resin component) that constitutes a major component of the dispersoid 61 is defined as the glass transition point of the resin material.

Furthermore, the melting point of the resin constituting the dispersoid 61 is preferably in the range of 90 to 150° C. By setting the melting point of the resin constituting the dispersoid 61 to a value within the above range, it is possible to carry out the dispersion medium removing step efficiently. It is to be noted that in a case where the resin material constituting the dispersoid 61 is composed of two or more kinds of resins (resin components), the melting point of a resin (resin component) that constitutes a major component of the dispersoid 61 is defined as the melting point of the resin material.

2. Solvent

The dispersoid 61 may contain a solvent capable of dissolving at least a part of the component of the dispersoid 61. This makes it possible to improve the fluidity of the dispersoid 61 in the dispersion liquid 6 and to allow the dispersoid 61 contained in the dispersion liquid 6 to have a relatively small particle diameter and small variations in particle size. As a result, the finally obtained toner (toner particles) has small variations in particle size and shape and a high degree of roundness.

The solvent to be contained in the dispersoid 61 is not particularly limited as long as it can dissolve at least a part of the component constituting the dispersoid 61, but is preferably one which can be easily removed in the conveying portion 3 of the toner production apparatus 1.

Further, the solvent preferably has low compatibility with the above-described dispersion medium 62 (e.g., a solvent having a solubility of 30 g or less per 100 g of the dispersion medium at 25° C.). The use of such a solvent makes it possible to finely disperse the dispersoid 61 in the dispersion liquid 6 with stability.

The composition of the solvent can be selected appropriately according to the kind of the resin described above, the composition of a coloring agent, or the composition of the dispersion medium.

Examples of the solvent include inorganic solvents such as water, carbon disulfide, and carbon tetrachloride, and organic solvents such as ketone-based solvents (e.g., methyl ethyl ketone (MEK), acetone, diethyl ketone, methyl isobutyl ketone (MIPK), methyl isopropyl ketone (MIPK), cyclohexanone, 3-heptanone, and 4-heptanone), alcohol-based solvents (e.g., methanol, ethanol, n-propanol, isopropanol, n-butanol, i-butanol, t-butanol, 3methyl-1-butanol, 1-pentanol, 2-pentanol, n-hexanol, cyclohexanol, 1-heptanol, 1-octanol, 2octanol, 2-methoxyethanol, allyl alcohol, furfuryl alcohol, and phenol), ether-based solvents (e.g., diethyl ether, dipropyl ether, diisopropyl ether, dibutyl ether, 1,2-dimethoxy ethane (DME), 1,4-dioxane, tetrahydrofuran (THF), tetrahydropyran (THP), anisole, diethylene glycol dimethyl ether (diglyme), and 2-methoxyethanol), cellosolve based solvents (e.g., methyl cellosolve, ethyl cellosolve, and phenyl cellosolve), aliphatic hydrocarbon-based solvent (e.g., hexane, pentane, heptane, cyclohexane, methylcyclohexane, octane, didecane, methylcyclohexene, and isoprene), aromatic hydrocarbon-based solvents (e.g., toluene, xylene, benzene, ethyl benzene, and naphthalene), aromatic heterocyclic compound-based solvents (e.g., pyridine, pyrazine, furan, pyrrole, thiophene, 2-methylpyridine, 3-methylpyridine, 4-methylpyridine, and furfuryl alcohol), amide-based solvents (e.g., N,N-dimethylformamide (DMF) and N,N-dimethylacetamide (DMA)), halide-based solvents (e.g., dichloromethane, chloroform, 1,2-dichloroethane, trichloroethylene, and chlorobenzene), ester-based solvents (e.g., acetylacetone, ethyl acetate, methyl acetate, isopropyl acetate, isobutyl acetate, isopentyl acetate, ethyl chloroacetate, butyl chloroacetate, isobutyl chloroacetate, ethyl formate, isobutyl formate, ethyl acrylate, methyl methacrylate, and ethyl benzoate), amine-based solvents (e.g., trimethylamine, hexylamine, triethylamine, and aniline), nitrile-based solvents (e.g., acrylonitrile and acetonitrile), nitro-based solvents (e.g., nitromethane and nitroethane), and aldehyde-based solvents (e.g., acetaldehyde, propionaldehyde, butyraldehyde, pentanal, and acrylaldehyde). These solvents can be used singly or in combination of two or more of them. Among these solvents, one containing the organic solvent is particularly preferable, and one containing one or more of the ether-based solvents, cellosolve-based solvents, aliphatic hydrocarbon-based solvents, aromatic hydrocarbon-based solvents, aromatic heterocyclic compound-based solvents, amide-based solvents, halide based solvents, ester-based solvents, nitrile-based solvents, nitro-based solvents, and aldehyde-based solvents is more preferable. By using such a solvent, it is possible to disperse each of the components as described above relatively easily in the dispersoid 61 sufficiently homogeneously.

Further, the dispersion liquid 6 usually contains a coloring agent. As a coloring agent, pigments, dyes, and the like can be used, for example. Examples of such pigments and dyes include Carbon Black, Spirit Black, Lamp Black (C. I. No. 77266), Magnetite, Titanium Black, Chrome Yellow, Cadmium Yellow, Mineral Fast Yellow, Naples Yellow, Naphthol Yellow S, Hansa Yellow G, Permanent Yellow NCG, Chrome Yellow, Benzidine Yellow, Quinoline Yellow, Tartrazine Lake, Chrome orange, Molybdate Orange, Permanent Orange GTR, Pyrazolone Orange, Benzidine Orange G, Cadmium Red, Permanent Red 4R, Watching Red calcium salt. Eosine Lake, Brilliant Carmine 3B. Manganese Violet, Fast Violet D, Methyl Violet Lake, Prussian Blue, Cobalt Blue, Alkali Blue Lake, Victoria Blue Lake, Fast Sky Blue, Indanthrene Blue BC, Ultramarine Blue, Spirit Blue, Phthalocyanine Blue, Chalco Oil Blue, Chrome Green, Chromium Oxide, Pigment Green B, Malachite Green Lake, Phthalocyanine Green, Final Yellow Green G, Rhodamine 6G, Quinacridone, Rose Bengal (C. I. No. 45432), C. I. Direct Red 1, C. I. Direct Red 4, C. I. Acid Red 1, C. I. Basic Red 1, C. I. Mordant Red 30, C. I. Pigment Red 48;1, C. I. Pigment Red 57:1, C. I. Pigment Red 122, C. I. Pigment Red 184, C. I. Direct Blue 1, C. I. Direct Blue 2, C. I. Acid Blue 9, C. I. Acid Blue 15, C. I. Basic Blue 3, C. I. Basic Blue 5, C. I. Mordant Blue 7, C. I. Pigment Blue 15:1, C. I. Pigment Blue 15:3, C. I. Pigment Blue 5:1, C. I. Direct Green 6, C. I. Basic Green 4, C. I. Basic Green 6, C. I. Pigment Yellow 17, C. I. Pigment Yellow 93, C. I. Pigment Yellow 97, C. I. Pigment Yellow 12, C. I. Pigment Yellow 180, C. I. Pigment Yellow 162, nigrosine dye (C. I. No. 50415B),metal complex salt dyes, silica, metal oxides (e.g., aluminum oxide, magnetite, maghemite, various ferrites, cupric oxide, nickel oxide, zinc oxide, zirconium oxide, titanium oxide, and magnesium oxide), and magnetic materials containing magnetic metals such as Fe, Co, and Ni. These coloring agents can be used singly or in combination of two or more of them. Such a coloring agent is usually contained in the dispersoid 61 of the dispersion liquid 6.

The amount of the coloring agent contained in the dispersion liquid 6 is not limited to any specific value, but is preferably in the range of 0.1 to 10 wt %, more preferably in the range of 0.3 to 3.0 wt %. If the amount of the coloring agent contained in the dispersion liquid 6 is less than the above lower limit value, there is a possibility that it is difficult to form a visible image having a sufficient density depending on the kind of coloring agent. On the other hand, if the amount of the coloring agent contained in the dispersion liquid 6 exceeds the above upper limit value, there is a possibility that fixing properties and electrification properties of the finally obtained toner are lowered.

Furthermore, the dispersion liquid 6 may contain wax. Usually wax is used to improve releasability. Examples of such wax include natural waxes such as vegetable waxes (e.g., candelilla wax, carnauba wax, rice wax, cotton wax, and Japan wax), animal waxes (e.g., beeswax and lanolin), mineral waxes (e.g., montan wax, ozokerite, and ceresin), oil waxes (e.g., paraffin wax, micro wax, microcrystalline wax, and petrolatum), and synthetic waxes such as synthetic hydrocarbon waxes (e.g., Fischer-Tropsch wax, polyethylene wax (polyethylene resin), polypropylene wax (polypropylene resin), oxidized polyethylene wax, and oxidized polypropylene wax), fatty acid amides (e.g., 12-hydroxystearic acid amide, stearic acid amide, phthalic anhydride imide, and chlorinated hydrocarbons). esters, ketones, and ethers. These waxes can be used singly or in combination of two or more of them. Further, crystalline polymeric resins having a low molecular weight can also be used as wax. For example, crystalline polymers having long alkyl side chains, such as homopolymers of acrylate (e.g., poly n-stearyl methacrylate and poly n-lauryl methacrylate) and copolymers of acrylate (e.g., n-stearyl acrylate-ethyl methacrylate copolymers) can also be used.

The amount of the wax contained in the dispersion liquid 6 is not limited to any specific value, but is preferably 1.0 wt % or less, more preferably 0.5 wt % or less. If the amount of the wax contained in the dispersion liquid 6 is too large, a phenomenon in which the wax exudes to the surface of the finally obtained toner particles conspicuously occurs due to liberation and agglomeration of the wax, so that the transfer efficiency of the toner tends to be lowered.

The softening point of the wax is not limited to any specific value, but is preferably in the range of 50 to 180° C., more preferably in the range of 60 to 160° C.

The dispersion liquid 6 may further contain other components such as emulsifying/dispersing agents, charge controlling agents, and magnetic powders. Among them, an emulsifying/dispersing agent makes it possible to, for example, improve the dispersibility of the dispersoid 61 in the dispersion liquid 6. Examples of such an emulsifying/dispersing agent include emulsifiers, dispersants, and dispersing aids.

Examples of the dispersants include: inorganic dispersants such as tricalcium phosphate; nonionic organic dispersants such as polyvinyl alcohol, carboxymethyl cellulose, and polyethylene glycol; anionic organic dispersants such as tristearic acid metal salts (e.g., aluminum salts), distearic acid metal salts (e.g., aluminum salts and barium salts), stearic acid metal salts (e.g., calcium salts, lead salts, and zinc salts), linolenic acid metal salts (e.g., cobalt salts, manganese salts, lead salts, and zinc salts), octanoic acid metal salts (e.g., aluminum salts, calcium salts, and cobalt salts), oleic acid metal salts (e.g., calcium salts and cobalt salts), palmitic acid metal salts (e.g., zinc salts), naphthenic acid metal salts (e.g., calcium salts, cobalt salts, manganese salts, lead salts, and zinc salts), resin acid metal salts (e.g., calcium salts, cobalt salts, manganese salts, lead salts, and zinc salts), polyacrylic acid metal salts (e.g., sodium salts), polymethacrylic acid metal salts (e.g., sodium salts), polymaleic acid metal salts (e.g., sodium salts), metal salts or acrylic acid-maleic acid copolymers (e.g., sodium salts), polystyrenesulfonic acid metal salts (e.g., sodium salts); and cationic organic dispersants such as quaternary ammonium salts. Among these dispersants, nonionic organic dispersants or anionic organic dispersants are particularly preferable.

The amount of the dispersant contained in the dispersion liquid 6 is not limited to any specific value, but is preferably 3.0 wt % or less, more preferably in the range of 0.01 to 1.0 wt %.

Examples of the dispersing aids include anionic surfactants, cationic surfactants, and nonionic surfactants.

The dispersing aid is preferably used together with the dispersant. In a case where the dispersion liquid 6 contains the dispersant, the amount of the dispersing aid contained in the dispersion liquid 6 is not limited to any specific value, but is preferably 2.0 wt % or less, more preferably in the range of 0.005 to 0.5 wt %.

Examples of the charge controlling agent include metal salts of benzoic acid, metal salts or salicylic acid, metal salts of alkyl salicylic acid, metal salts of catechol. metal-containing bisazo dyes, nigrosine dyes, tetraphenylborate derivatives, quaternary ammonium salts, alkyl pyridinium salts, chlorinated polyesters, and nitrohumic acid.

Examples of the magnetic powders include powders of metal oxides such as magnetite, maghemite, various ferrites, cupric oxide, nickel oxide, zinc oxide, zirconium oxide, titanium oxide, and magnesium oxide, and powders of magnetic materials containing magnetic metals such as Fe, Co, and Ni.

The dispersion liquid 6 may further contain, for example, zinc stearate, zinc oxide, or cerium oxide, in addition to the above-mentioned materials.

In the dispersion liquid 6, a component other than the dispersoid 61 may also be dispersed as an insoluble matter. For example, inorganic powders of silica, titanium oxide, or iron oxide, or organic powders of fatty acid or fatty acid metal salts may be dispersed in the dispersion liquid 6.

The average particle diameter of the dispersoid 61 contained in the dispersion liquid 6 is not limited to any specific value, but is preferably in the range of 1 to 9 μm, more preferably in the range of 1 to 5 μm.

The amount of the dispersoid 61 contained in the dispersion liquid 6 is not limited to any specific value, but is preferably in the range of 1 to 99 wt %, more preferably in the range of 5 to 95 wt %.

In the dispersion liquid 6, the dispersoid 61 may be in the form of solid, liquid, or a mixture of both. That is, the dispersion liquid 6 may be a suspension or an emulsion.

In a case where the dispersoid 61 is in a liquid state (e.g., a solution state or a molten state), it is possible to relatively easily set the average particle diameter of the dispersoid 61 finely dispersed in the dispersion medium 62 to a value within the above-described range. In addition, in a case where the dispersoid 61 is in a liquid state, it is also possible to allow the dispersoid 61 to have especially small variations in particle size and shape. As a result, the finally obtained toner has especially small variations in particle size and shape.

On the other hand, in a case where the dispersoid 61 is in a solid state, it is possible to more effectively prevent undesired components such as a solvent from remaining in the finally obtained toner. As a result, the obtained toner has especially excellent reliability. Further, in a case where the dispersoid 61 is in a solid state, that is, in a case where the dispersion liquid 6 is a suspension, the suspension as the dispersion liquid 6 may be prepared by way of an emulsion, for example. By doing so, the advantages obtained in a case where the dispersoid 61 is in a liquid state are also exhibited effectively while the advantages obtained in a case where the dispersoid 61 is in a solid state are exhibited properly.

In a case where the dispersion liquid 6 is an emulsion, the dispersion liquid 6 is preferably an O/W type emulsion, that is, an emulsion in which an oily dispersoid 61 (here, the term "oily dispersoid" means a liquid having a low degree of solubility in water) is dispersed in an aqueous dispersion medium 62. By using such an emulsion as the dispersion liquid 6, it is possible to produce a toner having small variations in particle size and shape with stability. In addition, the use of an aqueous liquid as the dispersion medium 62 makes it possible to reduce the amount of an organic solvent to be volatilized in the conveying portion 3 of the toner production apparatus 1 (which will be described later) or to volatilize substantially no organic solvent. Therefore, it is possible to produce a toner in a manner which has almost no adverse effects on the environment.

Such a dispersion liquid 6 as described above can be prepared by a method (a first method) described below.

First, an aqueous solution is prepared by adding a dispersant and/or a dispersion medium when necessary to water or a liquid having good compatibility with water (that is, an aqueous liquid).

At the same time, a resin liquid containing a resin that is a main component of a toner or a precursor thereof (hereinafter, collectively referred to as a "resin material") is prepared. At this time, the above-described solvent may be used in addition to the resin material. Alternatively, a resin liquid may be prepared by melting a resin material by heating.

Next, the thus obtained resin liquid is added drop by drop to the aqueous solution under stirring to obtain a dispersion liquid 6 in which a dispersoid 61 containing the resin material is dispersed in an aqueous dispersion medium 62. By preparing a dispersion liquid 6 according to such a method, it is possible to further increase the degree of roundness of a dispersoid 61 contained in the dispersion liquid 6. As a result, the finally obtained toner particles have an especially high degree of roundness and especially small variations in shape. In this connection, it is to be noted that the aqueous solution and/or the resin liquid may be heated during the dropping of the resin liquid. Further, in a case where the resin liquid is prepared using a solvent, at least a part of the solvent contained in the dispersoid 61 may be removed after the dropping of the resin liquid by heating the obtained dispersion liquid 6 or placing the obtained dispersion liquid 6 in a reduced-pressure atmosphere. For example, by removing most of the solvent contained in the dispersoid 61, it is possible to allow the dispersion liquid 6 to be a suspension.

Although one method for preparing a dispersion liquid 6 has been described above by way of example, a dispersion liquid to be used in the present invention is not limited to one prepared by such a method, and may also be prepared by a different method (a second method) as described below.

First, an aqueous solution in prepared by adding a dispersant and/or a dispersion medium when necessary to water or a liquid having good compatibility with water.

At the same time, a powdery or particulate material containing a resin material is prepared.

Next, the powdery or particulate material is added little by little to the aqueous solution under stirring to obtain a dispersion liquid 6 in which a dispersoid 61 containing the resin material is dispersed in an aqueous dispersion medium 62. According to such a method, substantially no organic solvent is volatilized in the conveying portion 3 of the toner production apparatus 1. Therefore, it is possible to produce a toner in a manner that has almost no adverse effects on the environment. In this connection, it is to be noted that the aqueous solution may be heated when the powdery or particulate material is added to the aqueous solution.

Further, a dispersion liquid 6 to be used in the present invention may also be prepared by a method (a third method) as described below.

First, a resin dispersion liquid, in which at least a resin material is dispersed, and a coloring agent dispersion liquid, in which at least a coloring agent is dispersed, are prepared.

Next, the resin dispersion liquid and the coloring agent dispersion liquid are mixed and stirred. At this time, a flocculating agent such as an inorganic metal salt or the like may be added when necessary under stirring.

By stirring them for a predetermined time, agglomerates of the resin material and the coloring agent are formed, so that a dispersion liquid 6 in which the agglomerates as a dispersoid 61 are dispersed is obtained.

In the dispersion liquid preparation methods as described above, a kneaded material containing a resin material (a binder resin) may also be used. Specifically, in the first and third methods, a kneaded material containing a resin material may be used as the "resin material", and in the second method, a kneaded material containing a resin material may be used an the "powdery or particulate material". By using such a kneaded material containing a resin material, it is possible to obtain toner particles in which the components thereof are more homogeneously mixed. In particular, even in a case where a toner is produced using two or more components having poor dispersibility and compatibility, the above-described effect can be obtained. It is to be noted that the kneaded material may contain other components in addition to the resin component (e.g., coloring agents, waxes, and charge controlling agents). When the kneaded material contains such components in addition to the resin component, the above-described effect becomes more conspicuous.

Further, a dispersion liquid 6 to be used in the present invention may also be prepared according to a method disclosed in, for example, Japanese Patent Application No. 2003-113428. Specifically, a liquid containing a powdery or particulate resin material (kneaded material) is injected through two or more nozzles to collide the liquids injected through each of the nozzles with each other, so that the resin material (the kneaded material) is formed into fine particles. In this way, a dispersion liquid 6 containing the fine particles as a dispersoid 61 is obtained. According to such a method, it is possible to easily allow the fine particles of the dispersoid 61 contained in the dispersion liquid 6 to have a relatively small size (a particle diameter within the above-described range) and small variations in size.

The dispersion liquid 6 obtained by the above-described method is preferably subjected to deaeration treatment (a deaeration process) before the dispersion liquid 6 is ejected from the toner production apparatus 1 which will be described later. By subjecting the dispersion liquid 6 to deaeration treatment, it is possible to reduce the amount of gas dissolved in the dispersion liquid 6, thereby preventing the generation of bubbles or the like in the droplets 6A effectively when the dispersion medium 62 is removed from the droplets 6A of the ejected dispersion liquid 6 in the conveying portion 3 of the toner production apparatus 1. Therefore, it is possible to prevent defective toner particles (e.g., hollow particles and chipped particles) from mixing in the finally obtained toner effectively. As a result, it is possible to obtain a toner having a uniform particle shape and a narrow particle size distribution easily and reliably. The thus finally obtained toner has especially excellent transfer properties, fluidity and cleaning properties and the like. Further, by subjecting the dispersion liquid 6 to deaeration treatment, it is also possible to reduce the ratio of pore (void) in the finally obtained toner particles, thereby further improving the reliability of the toner.

Examples of a method of deaeration treatment include, but not limited thereto, a method in which ultrasonic vibration is applied to the dispersion liquid (that is, an ultrasonic vibration method) and a method in which the dispersion liquid is placed in a reduced-pressure atmosphere (that is, an evacuation method).

In a case where the evacuation method is used for the deaeration treatment, the pressure of an atmosphere where the dispersion liquid is placed is preferably 80 kPa or less, more preferably in the range of 0.1 to 40 kPa, even more preferably in the range of 1 to 27 kPa. By setting the ambient pressure during deaeration treatment to a value within the above range, it is possible to remove gas dissolved in the dispersion liquid 6 efficiently while properly maintaining the shape of the dispersoid 61 contained in the dispersion liquid 6.

<Toner Production Apparatus>

Hereinbelow, the toner production apparatus 1 used in a method for producing a toner according to the present invention will be described in detail.

Figure 2:
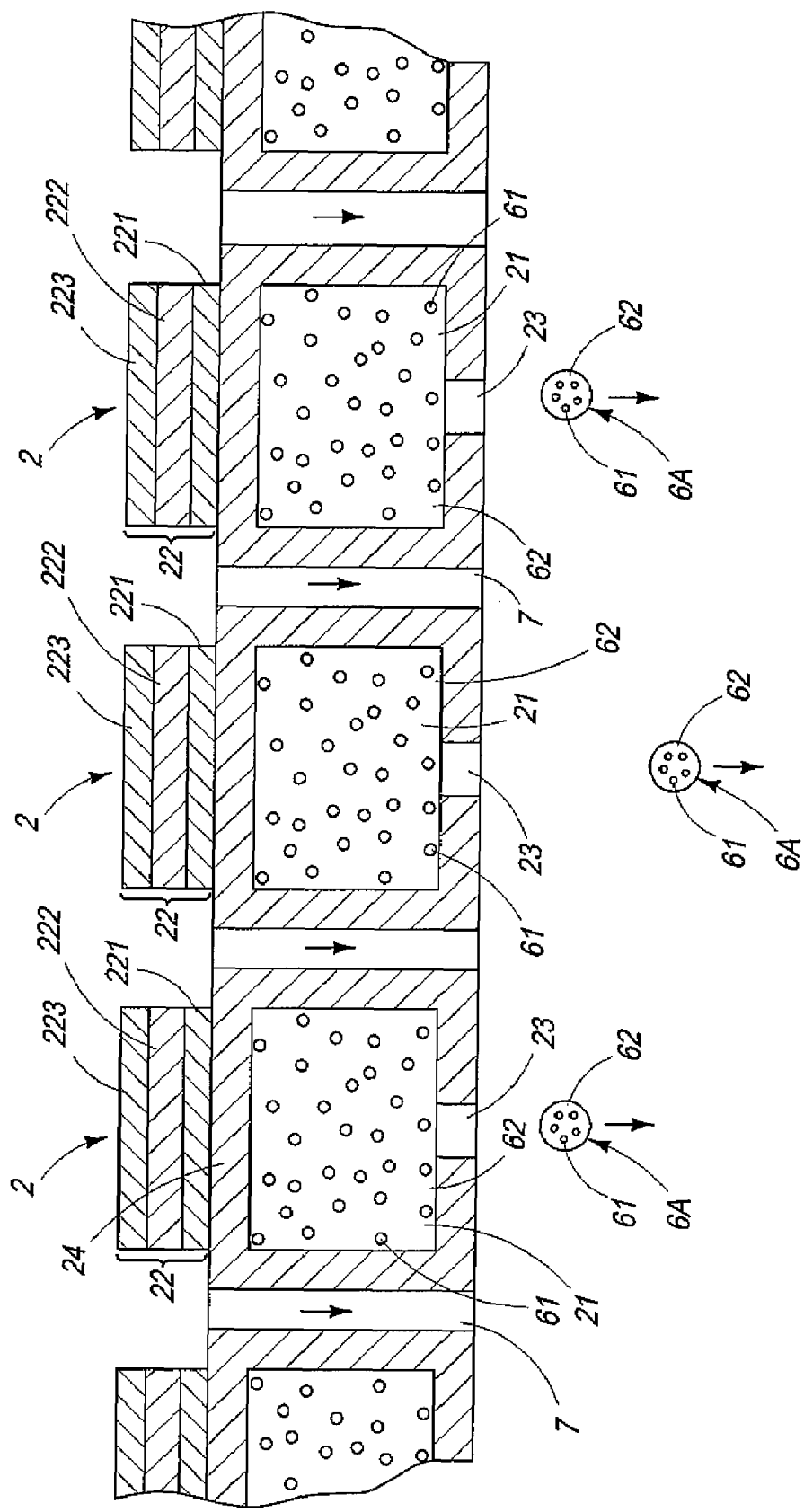
FIG. 2 is an enlarged sectional view of the vicinity of head portions of the toner production apparatus shown in FIG. 1.

FIG. 1 is a cross-sectional view which schematically shows the embodiment of the toner production apparatus for use in producing a toner of the present invention. FIG. 2 is an enlarged sectional view of the vicinity of head portions of the toner production apparatus shown in FIG. 1.

The toner production apparatus 1 includes head portions 2 for ejecting the dispersion liquid 6 as described above (especially, the dispersion liquid 6 which has been subjected to deaeration treatment), a dispersion liquid supply portion 4 for supplying the dispersion liquid 6 to the head portions 2, a conveying portion 3 in which the dispersion liquid 6 ejected from the head portions 2 is conveyed, granulation prevention agent supply means 141 for supplying a granulation prevention agent which will be described later to the ejected dispersion liquid 6 in the form of droplets and a collecting portion 5 for collecting produced resin particles 9 (hereinafter, also referred to as a toner). In such a toner production apparatus 1, the droplets 6A are formed by ejecting the dispersion liquid 6 from the head portions 2 (hereinafter, also referred to as a droplets forming step), and then the dispersion medium 62 is removed from the droplets 6A in the conveying portion 3 to obtain resin particles 9 each of which is composed of a fine particle derived from a single fine particle of the dispersoid 61 (hereinafter, also referred to as a dispersion medium removing step).

Hereinafter, operations of the toner production apparatus 1, namely a method for producing the resin particles of the present invention as well as each component of the toner production apparatus 1 will be described.

In the dispersion liquid supply portion 4, the dispersion liquid 6 in which the dispersoid 61 is finely dispersed in the dispersion medium 62 is stored. The dispersion liquid 6 is fed to the head portions 2 from the dispersion liquid supply portion 4. In this connection, constituent materials of the dispersion liquid 6 will be described later in detail.

The dispersion liquid supply portion 4 is not particularly limited as long as it has the function of supplying the dispersion liquid 6 to the head portions 2. In this embodiment, as shown in FIG. 1, the dispersion liquid supply portion 4 has stirring means 41 for stirring the dispersion liquid 6. Namely the dispersion liquid 6 before being ejected is kept in the dispersion liquid supply portion 4 having the stirring means 41, and then supplied to the head portions 2 from the dispersion liquid supply portion 4. By providing the stirring means 41, it is possible to supply the dispersion liquid 6 to the head portions 2 while dispersing the dispersoid 61 sufficiently homogeneously in the dispersion liquid 6, even when the dispersoid 61 is hard to be dispersed in the dispersion medium.

Each of the head portions 2 has a dispersion liquid storage portion 21 to which the dispersion liquid 6 is supplied from the dispersion liquid supply portion 4 as described above, a piezoelectric device (element) 22 for changing the internal pressure of the dispersion liquid storage portion 21, and a nozzle 23 communicating with the dispersion liquid storage portion 21. In the dispersion liquid storage portion 21, the dispersion liquid 6 which has been supplied from the dispersion liquid supply portion 4 is stored. Further, a part of the dispersion liquid storage portion 21 is defined by a diaphragm 24 on which a piezoelectric device 22 is provided.

As shown in FIG. 2, each of the piezoelectric devices 22 is formed by laminating a lower electrode (a first electrode) 221, a piezoelectric element 222, and an upper electrode (a second electrode) 223 in this order from the bottom side. In other words, each of the piezoelectric devices 22 has a structure in which the piezoelectric element 222 is provided between the upper electrode 23 and the lower electrode 221.

The piezoelectric device 22 has a function to instantaneously increase the internal pressure of the ejection liquid storage portion 21 by vibrating (displacing) the diaphragm 24. In this way, the dispersion liquid 6 stored in the dispersion liquid storage portion 21 is ejected to the conveying portion 3 through the nozzle 23 by a pressure pulse (a piezoelectric pulse) of the piezoelectric device 22.

In particular, in each of the head portions 2, the piezoelectric element 222 keeps its original shape in a state where a predetermined eject signal from a piezoelectric device driving circuit (not shown in the drawings) is not inputted, that is, in a state where a voltage is not applied across the lower electrode 221 and the upper electrode 223 of the piezoelectric device 22. At this time, since the diaphragm 24 also keeps its original shape, the volume of the dispersion liquid storage portion 21 is not changed. That is, the dispersion liquid 6 is not ejected through the nozzle 23.

On the other hand, the piezoelectric element 222 changes its shape when a predetermined ejecting signal from the piezoelectric device driving circuit is inputted, that is, when a predetermined voltage is applied across the lower electrode 221 and the upper electrode 223 of the piezoelectric device 22. As a result, the diaphragm 24 is significantly bent (toward the lower side in FIG. 2), so that the volume of the dispersion liquid storage portion 21 is reduced (changed). At this time, the pressure in the dispersion liquid storage portion 21 is instantaneously increased, so that the dispersion liquid 6 is ejected in the form of a droplet through the nozzle 23 to form the droplet 6A.

When single ejection of the dispersion liquid 6 is finished, namely one droplet 6A is formed, the piezoelectric device driving circuit stops a voltage from being applied across the lower electrode 221 and the upper electrode 223. As a result, the piezoelectric device 22 is returned to its almost original shape so that the volume of the ejection liquid storage portion 21 is increased. At this time, since pressure is exerted on the dispersion liquid 6 in the direction from the dispersion liquid supply portion 4 to the nozzle 23 (that is, in the positive direction), it is possible to prevent air from entering the dispersion liquid storage portion 21 through the nozzle 23. Then, the dispersion liquid 6 in an amount equal to the ejected amount thereof is supplied to the dispersion liquid storage portion 21 from the dispersion liquid supply portion 4.

By carrying out predetermined periodic application of a voltage in such a manner as described above, the droplet 6A is repeatedly formed due to vibration of the piezoelectric device 22.

As described above, by carrying out ejection (discharge) of the dispersion liquid 6 by the use of a pressure pulse due to vibration of the piezoelectric element 222, it is possible to eject the dispersion liquid 6 intermittently drop by drop with the shape of the droplet 6A being stable.

Further, since ejection of the dispersion liquid is carried out in a manner as described above, it is possible to control the frequency of the piezoelectric element relatively precisely, the area of an opening of the nozzle (the diameter of the nozzle), the temperature and viscosity of the dispersion liquid, the ejected amount of one droplet of the dispersion liquid, the ratio of the dispersoid in the dispersion liquid, or the particle diameter of the dispersoid contained in the dispersion liquid, and therefore it is possible to produce a toner having a desired shape and size easily. In addition, by controlling such conditions, it is possible to control the production amount of a toner easily and reliably.

By ejecting the dispersion liquid by the use of vibration of the piezoelectric element, it is possible to eject the dispersion liquid at predetermined intervals more reliably. This makes it possible to effectively prevent collision or agglomeration between the formed droplets 6A of the dispersion liquid 6, thus resulting in preventing formation of defective particles effectively.

The initial velocity of the dispersion liquid 6 at the time when the dispersion liquid 6 is ejected from the head portions 2 into the conveying portion 3 is preferably in the range of, for example, 0.1 to 10 m/sec, more preferably in the range of 2 to 8 m/sec. If the initial velocity of the dispersion liquid 6 is less than the above lower limit value, productivity of resin particles 9 and a toner is lowered. On the other hand, if the initial velocity of the dispersion liquid 6 exceeds the above upper limit value, the finally obtained toner particles tend to have a lower degree of sphericity.

The viscosity of the dispersion liquid 6 ejected from the head portions 2 is not limited to any specific value, but is preferably in the range of, for example, 0.5 to 200 (mPa·s) more preferably in the range of 1 to 25 (mPa·s). If the viscosity of the dispersion liquid 6 is less than the above lower limit value, It is difficult to control the size of each droplet 6A to be formed properly, thus resulting in a case where the finally obtained toner particles have large variations in size. On the other hand, if the viscosity of the dispersion liquid 6 exceeds the above upper limit value, there is a tendency that the formed droplets 6A have a larger diameter, the ejecting velocity of the dispersion liquid 6 becomes low, and the amount of energy repaired to eject the dispersion liquid 6 becomes large. In a case where the viscosity of the dispersion liquid 6 is especially high, it is impossible to eject the dispersion liquid 6 in the form of droplets.

In addition, it is preferred that the ejection of the dispersion liquid 6 from the head portions 2 is carried out at a temperature equal to or lower than the glass transition point of the dispersoid 61. This enables to prevent the dispersoid 61 from sticking together when forming the droplets 6A of the dispersion liquid 6, thus making it possible to prevent fine particles derived from the dispersoid 61 from being bonded with each other.

The temperature of the dispersion liquid 6 to be ejected from the head portions 2 is not limited to any specific value, but is preferably equal to or lower than the temperature in the conveying portion 3 which will be described later in detail (the processing temperature of the dispersion medium removing step). By setting the temperature of the dispersion liquid 6 to be ejected from the head portions 2 to a value within the above range, it is possible to prevent effectively the dispersion liquid 6 from becoming solidified unnecessarily due to volatilization of the dispersion medium 62 from the dispersion liquid 6 immediately following the ejection of the dispersion liquid 6. In addition, it is also possible to prevent effectively the clogging of the nozzles 23 caused by the volatilization of the dispersion medium 62 from the dispersion liquid 6 in the vicinity of the nozzles 23 prior to ejection of the dispersion liquid 6 (prior to cutting of the dispersion liquid 6). Particularly, when the temperature of the dispersion liquid 6 to be ejected from the head portions 2 (the dispersion liquid 6 in the head portions 2) is defined as $T_0$ (° C.), and the temperature in the conveying portion 3 which will be described later in detail (the processing temperature of the dispersion medium removing step) is defined as $T_1$ (° C.), $T_0$ and $T_1$ preferably satisfy the relation : $-5 \leq T_1 - T_0 \leq 60$, more preferably satisfy the relation: $-5 \leq T_1 - T_0 \leq 50$, even more preferably satisfy the relation: $5 \leq T_1 - T_0 \leq 40$. By allowing $T_0$ and $T_1$ to satisfy the above relation, it is possible to make the effects described above more conspicuous.

The dispersion liquid 6 to be ejected from the head portions 2 may be heated in advance (particularly, may be heated to a temperature equal to or lower than the temperature in the conveying portion 3 which will be described later in detail). By heating the dispersion liquid 6 in such a manner, it is possible to make the dispersoid 61 be in a molten state (or in a softened state where viscosity is relatively low) when the dispersion liquid 6 is ejected, even if the dispersoid 61 is in a solid state (or in a state where viscosity is relatively high) at room temperature. Therefore, the dispersoid 61 in the droplets 6A has an especially high degree of roundness in the conveying portion 3 which will be described later, so that the finally obtained toner particles also have a high degree of roundness.

The ejected amount of one droplet of the dispersion liquid 6, that is the average volume of the droplets 6A slightly varies depending on the content of the dispersoid 61 in the dispersion liquid 6, but is preferably in the range of 0.05 to 100 pl, more preferably in the range of 0.5 to 5 pl. By setting the ejected amount of one droplet of the dispersion liquid 6 to a value within the above range, it is possible to form the droplets 6A of the dispersion liquid 6 stably while reducing the variations in the particle diameter of the droplets 6A. As a result, it becomes possible to reduce the variations in the particle diameter of the finally obtained resin particles 9 more effectively.

The frequency of the piezoelectric device 22 (the frequency of an piezoelectric pulse) is not limited to any specific value, but is preferably in the range of 1 kHz to 500MHz, more preferably in the range of 5 kHz to 200 MHz. If the frequency of the piezoelectric device 22 is less than the above lower limit value, productivity of a toner is lowered. On the other hand, if the frequency of the piezoelectric device 22 exceeds the above upper limit value, there is a possibility that the ejection of the dispersion liquid 6 cannot follow the frequency of the piezoelectric device 22 so that the sizes of the droplets of the dispersion liquid 6 become different from each other.

The dispersion liquid 6 may be ejected at substantially the same time from all the head portions 2, but it is preferred that the dispersion liquid 6 be ejected in such a manner that the timing of ejection is different in at least two adjacent head portions 2. This makes it possible to prevent collision and agglomeration effectively between the dispersion liquid 6 in the form of droplets, namely between the droplets 6A ejected from the adjacent head portions 2, before the resin particles 9 are formed.

The shape of the nozzle 23 is not particularly limited, but it is preferred that each nozzle 23 has a substantially circular shape. By making the shape of the nozzle substantially circular, it is possible to increase sphericity of each droplet of the ejected dispersion liquid 6, the resin particles 9 formed in the conveying portion 3, and the finally obtained toner particles.

In a case where the shape of the nozzle 23 is substantially circular, the diameter thereof (the diameter of a nozzle) is preferably in the range of 5 to 500 μm, more preferably in the range of 10 to 200 μm. If the diameter of the nozzle 23 is less than the above lower limit value, clogging is likely to occur, thus resulting in a case where the ejected dispersion liquid 6 in the form of droplets 6A has large variations in size. On the other hand, if the diameter of the nozzle 23 exceeds the above upper limit value, there is a possibility that the ejected dispersion liquid 6 in the form of droplets 6A contains bubbles depending on the power balance between the negative pressure of the dispersion liquid storage portion 21 and the surface tension at the nozzle.

In the toner production apparatus 1, it is preferred that the vicinity of the nozzle 23 of each of the head portions 2 (especially, the inner surface of an opening of each of the nozzles 23, and the surface of each of the head portions 2 on the side where the nozzle 23 is provided (that is, the surface of each of the head portions 2 on the lower side in FIG. 2)) has repellency against the dispersion liquid 6. This makes it possible to prevent the dispersion liquid 6 from being adhered to the vicinity of the ejecting portions effectively. As a result, it is possible to effectively prevent the nozzle 23 from having difficulty in ejecting and cutting the dispersion liquid 6. As described above, when the dispersion liquid 6 is effectively prevented from being adhered to the vicinity of the ejecting portions, the shape stability of the ejected droplets of the dispersion liquid 6 is improved (that is, the droplets have small variations in size and shape), thereby allowing the finally obtained toner particles to have small variations in size and shape.

Examples of a material having such a liquid repellency include, fluorine-based resins such as polytetrafluoroethylene (PTFE) and silicone-based materials.

Further, in the toner production apparatus 1, it is also preferred that the vicinity of the nozzle 23 of each of the head portions 2 (especially, the inner surface of an opening of each of the nozzles 23, and the surface of each of the head portions 2 on the side where the nozzle 23 is provided (that is, the surface of each of the head portions 2 on the lower side in FIG. 2) is treated so as to have hydrophobicity. By allowing the vicinity of the nozzle 23 of each of the head portions 2 to have hydrophobicity, the liquid repellency as described above is more properly exhibited so that the above-described effects become more conspicuous, in a case where the dispersion medium 62 of the dispersion liquid 6 is mainly composed of water. As a method for treating the vicinity of the nozzle 23 of each of the head portions 2 so as to have hydrophobicity, formation of a coating film constituted of a hydrophobic material (e.g. the above-mentioned material having liquid repellency) can be mentioned, for example. In the meantime, although water has relatively high viscosity among various liquids, by allowing the vicinity of the ejecting potion of each of the head portions 2 to have hydrophobicity, it is possible to prevent effectively the occurrence of negative effects caused by the adhesion of the dispersion liquid 6 to the vicinity of the ejecting portions even when water is used an the constituent material of the dispersion medium 62. For this reason, when the vicinity of the nozzle 23 of each of the head portions 2 has hydrophobicity, the dispersion liquid 6 containing substantially no organic solvent or the dispersion liquid 6 containing almost no organic solvent can be used, thereby enabling a toner to be produced in a manner that has no adverse effects on the environment.

A gas injection opening 7 is provided between the adjacent head portions 2 as shown in FIG. 2. Further, as shown in FIG. 1, gas stream supply means 10 is connected to the gas injection opening 7 through a duct 11.

The gas stream supply means 10 is adapted to inject gas at a substantially even pressure through the duct 101 from each of the gas injection openings 7 provided between the adjacent head portions 2. This makes it possible to convey the droplets 6A of the dispersion liquid 6 intermittently ejected from the nozzles 23 with the distance between the droplets 6A being maintained, thereby enabling to obtain resin particles 9. As a result, it is possible to effectively prevent collision and agglomeration between the droplets 6A.

Further, by injecting gas supplied from the gas stream supply means 10, through the gas injection openings 7, it is possible to form an air stream flowing in substantially one direction (that is, in a downward direction in FIG. 1) in the conveying portion 3. Such an air stream makes it possible to efficiently convey the droplets 6A of the dispersion liquid 6 (the resin particles 9) in the conveying portion 3.

The gas stream supply means 10 is equipped with a heat possible to set the temperature of gas to be injected from the gas injection openings 7 to an appropriate value, thereby enabling to efficiently solidify the droplets 6A of the dispersion liquid 6 ejected into the conveying portion 3, namely enabling to remove the dispersion medium 62 from the droplets 6A efficiently.

Further, by providing such gas stream supply means 10, it is possible to control the solidification rate for removing the dispersion medium 62 from the droplets 6A easily by adjusting the amount of an air stream to be supplied.

The temperature of gas to be injected from the gas injection openings 7 varies depending on the compositions of the dispersoid 61 and the dispersion medium 62 contained in the dispersion liquid 6, but is preferably in the range of 0 to 70° C., more preferably in the range of 15 to 60° C. By setting the openings 7 to a value within the above range, it is possible to remove the dispersion medium 62 effectively from the droplets 6A while preventing the undesirable degeneration of the resin material constituting the resin particles 9 to be obtained. As a result, productivity of a toner becomes especially high.

The humidity of gas to be injected from the gas injection openings 7 is preferably 50% RH or less, more preferably 30% RH or less. By setting the humidity of gas to be injected from the gas injection openings 7 to 50% RH or less, it is possible to remove the dispersion medium 62 efficiently from the droplets 6A of the dispersion liquid 6 in the conveying portion 3, thereby further improving the productivity of the resin particles 9 (a toner).

A granulation prevention agent 14 for preventing or suppressing fine particles derived from the dispersoid 61 from being agglomerated to granulate is applied to the dispersion liquid controlling agglomeration and granulation between the dispersoid 61 (the droplets 6A) that has been ejected in the manner as described above.

As shown in FIG. 1, the granulation prevention agent 14 is injected from the granulation prevention agent supply means 141 toward a direction opposite to the ejecting direction of the dispersion liquid 6.

The granulation prevention agent 14 exist between the dispersoid 61 contained in the droplets 6A to prevent the dispersoid 61 (that is the fine particles derived from the dispersoid 61) from directly contacting with each other, whereby preventing the dispersoid 61 from being agglomerated and then granulated. As a result, each of the fine particles derived from the dispersoid 61 forms each of the resin particles (toner particles) 9 in the dispersion medium removing step described later. Since each of the resin particles 9 obtained in this manner is not an agglomerate of fine particles, it has superior mechanical strength. Further, this makes it possible to prevent the formation of resin particles having voids (hollow resin particles) or defective particles, thereby enabling to produce the resin particles 9 having a uniform particle shape and a small (narrow) particle size distribution effectively. In addition, since it is unnecessary to use the fine particles derived from the dispersoid 61 at a high temperature to enhance mechanical strength, it is possible to prevent undesirable degeneration of the resin material constituting the resin particles 9.

Examples of such a granulation prevention agent 14 include fine particles composed of inorganic materials such as silica, metal oxides (e.g., aluminum oxide, titanium oxide, strontium titanate, cerium oxide, magnesium oxide, chromium oxide, titania, zinc oxide, alumina, and magnetite), nitrides such as silicon nitride, carbides such as silicon carbide, calcium sulfate, calcium carbonate, and aliphatic metal salts, fine particles composed of organic materials such as acrylic resins, fluorocarbon resins, polystyrene resins, polyester resins, aliphatic metal salts. These materials can be used singly or in combination of two or more of them.

Among these materials, inorganic fine particles are preferably used, and inorganic fine particles composed of silica and/or titanium oxide are more preferably used as a constituent material of the granulation prevention agent 14. By using such inorganic fine particles as a constituent material of the granulation prevention agent 14. It is possible to prevent adverse effects on the properties of the resin particles 9 to be finally obtained while preventing the dispersoid 61 from being agglomerated and then granulated with each other more reliably. Further, in a case where such a granulation prevention agent 14 is collected as resin particles 9 in a state of adhering to the surfaces of the fine particles derived from the dispersoid 61, the granulation prevention agent 14 can function as a one kind of external additives.

In this regard, it is preferred that the surface of such a granulation prevention agent 14 is subjected to a lyophilic treatment (hydrophilic treatment). This makes it possible to apply the granulation prevention agent 14 to the above-described dispersion liquid 6 (droplets 6A) easily. As a result agglomeration and granulation between the dispersoid 61 in the dispersion liquid 6 (that is, between the fine particles derived from the dispersoid 61) can be prevented more reliably.

Examples of such a lyophilic treatment include a physical treatment such as a plasma treatment and a chemical treatment in which hydroxyl is added to the surface of the granulation prevention agent 14.

For example, the granulation prevention agent 14 may be applied to the dispersion liquid 6 in a cooled area provided in the vicinity of each of the head portions 2. This makes it possible to apply the granulation prevention agent 14 to the ejected dispersoid liquid 6 before removal of the dispersion medium 62 substantially starts, thereby enabling to prevent the dispersoid 61 (that is, fine particles derived from dispersoid 61) from being granulated with each other more reliably. In this regard, an ambient temperature of the cooled area is preferably in the range of about 10 to 35° C, more preferably in the range of about 20 to 25° C.

Further, when the average particle diameter of the granulation prevention agent 14 is defined as Dc (μm) and the average particle diameter of the dispersoid 61 is defined as Dm (μm), it is preferred that Dc and Dm satisfies the relation: $1\times10^{-3} \leq Dc/Dm \leq 1\times10^{-1}$, more preferably satisfy the relation: $5\times10^{-3} \leq Dc/Dm \leq 2\times10^{-2}$. When Dc and Dm satisfy the above relation, it is possible to prevent the dispersoid 61 in the droplets 6A from being agglomerated with each other effectively, thus enabling each fine particle derived from the dispersoid 61 to form each of the resin particles 9 more reliably. As a result, resin particles each having superior mechanical strength and a uniform shape can be obtained.

In particular, the average particle diameter of the granulation prevention agent 14 is preferably in the range of 0.02 to 1.0 μm in the range of 0.02 to 0.5 μm. By setting the average particle diameter of the granulation prevention agent 14 to a value in the above range, it is possible to prevent effectively the dispersoid 61 in the droplets 6A from being agglomerated with each other, thus enabling each fine particle derived from the dispersoid 61 to form each of the resin particles 9 more reliably. As a result, resin particles each having superior mechanical strength and a uniform shape can be obtained.

Further, the amount of the granulation prevention agent 14 contained in the finally obtained resin particles 9 is preferably in the range of about 0.1 to 1.0 wt %, more preferably in the range of about 0.1 to 0.8 wt %. This makes it possible to prevent the dispersoid 61 in the droplets 6A from being agglomerated with each other effectively, whereby allowing the finally obtained resin particles 9 to exhibit their functions sufficiently.

Furthermore, when the average particle diameter of the ejected droplets 6A is defined as Dd (μm) and the average particle diameter of the dispersoid 61 is defined an Dm (μm). it is preferred that Dd and Dm satisfy the relation; $0.5 < Dm/Dd < 1.0$, more preferably satisfy the relation: $0.7 < Dm/Dd < 1.0$. By allowing Dd and Dm to satisfy the above relation, it is possible to prevent each of the ejected droplets 6A from containing two or more fine particles derived from the dispersoid 61. As a result, each of the droplets 6A is composed of the dispersion medium 62 containing a single fine particle derived from the dispersoid 61, or composed of only the dispersion medium 61 without a dispersoid 61. This enables to prevent the dispersoid 61 from being agglomerated with each other more reliably, thus making it possible to obtain resin particles having superior mechanical strength and a uniform shape.

In particular, the average particle diameter (Dd) of the droplets 6A is preferably in the range of 1.0 to 9.0 μm, more preferably in the range of 2.0 to 5.0 μm. By setting Dd to a value in the above range, it is possible to form the droplets 6A in a stable manner while reducing the variations in the particle diameter of the droplets 6A of the dispersion liquid 6. As a result, the variations in the particle diameter of the obtained resin particles 9 can be reduced more effectively.

Further, a standard deviation of average particle diameter (Dd) of the droplets 6A is preferably equal to or less than 1.0 μm, more preferably equal to or less then 0.8 μm. By setting the standard deviation to a value in the above range, it is possible to reduce the variations in the average particle size of the obtained resin particles 9 effectively.

The droplets 6A to which the granulation prevention agent 14 is applied become the resin particles 9 each of which is composed of a fine particles derived from the dispersoid 61 by removing the dispersion medium 62 while conveying the droplets 6A through the conveying portion 3. In this regard, in a case where the solvent as described above is contained in the dispersoid 61, the solvent is also usually removed in the conveying portion 3.

Especially, in the present invention, since the granulation prevention agent 14 is applied to the droplets 6A, it is possible to prevent the dispersoid 61 (that is, the fine particles derived from the dispersoid 62) contained in the droplets 6A from being agglomerated and granulated with each other while removing the dispersion medium 62 from the droplets 6A, whereby enabling to obtain the resin particles 9A each of which is composed of a fine particle derived from the dispersoid 61. Therefore, it becomes possible to obtain the resin particles 9 having a uniform particle shape and a narrow particle size distribution only by making the dispersoid 61 have a uniform particle shape and a narrow particle size distribution.

Further, each of the resin particles 9 is obtained from a fine particle derived from a single particle of the dispersoid 61 not an agglomerate of the dispersoid 61 as the prior art described above, thus the finally obtained resin particles 9 can have superior mechanical strength.

This means that it is possible to obtain resin particles 9 having superior mechanical strength without fusing the fine particles derived from the dispersoid 61 for enhancing mechanical strength thereof, namely exposing the fine particles to a temperature higher than the melting point thereof. With this result, it is possible to prevent undesirable degeneration of the resin material constituting the resin particles 9 from occurring by the heat.

Furthermore, according to the method described above, since the droplets 6A are not exposed to a high temperature when removing the dispersion medium 62, it is possible to prevent the formation of void particles and defective particles.

The conveying portion 3 is constructed from a tubular housing 31. During the production of a toner, it is preferred that the inside of the housing 31 is maintained at a temperature within a predetermined range. This makes it possible to reduce variations in properties among toner particles (resin particles 9) which are likely to be caused by the difference in production conditions, thereby improving the reliability of a toner as a whole. For example, the housing 31 may include two or more regions having different temperature in the longitudinal direction thereof (that is, in the direction that the dispersion liquid 6 and the resin particles are to be conveyed). This makes it possible to more smoothly remove the dispersion medium 62 while preventing undesirable degeneration of the resin constituting the resin particles 9 (toner particles), thereby improving the productivity of resin particles 9 (toner particles).

In order to maintain the inside of the conveying portion 9 at a temperature within a predetermined range, a heat source or a cooling source may be provided inside or outside the housing 31, or the housing 31 may be formed as a jacket having a passage of a heat medium or a cooling medium.

Further, the temperature in the conveying portion 3 (the processing temperature of the dispersion medium removing step) is preferably equal to or lower than the glass transition point of the resin material constituting the dispersoid 61. This makes it possible to remove the dispersion medium 62 while preventing fine particles derived from the dispersoid 61 from being softened, bonded and agglomerated with each other more effectively, thereby allowing the obtained resin particles 9 to have a uniform shape and sufficiently high shape stability. As a result, resin particles having a high degree of sphericity (that is, resin particles having a shape close to a geometrically perfect sphere) are produced relatively easily. In a case where the dispersoid 61 is composed of two or more kinds of the resin materials (resin components), namely in a case where the dispersoid 61 has two or more kinds of resin materials, the temperature in the conveying portion 3 (the processing temperature of the dispersion medium removing step) is preferably equal to or lower than the glass transition point of the resin material that is a major component of the dispersoid 61, more preferably equal to or lower than the glass transition points of all resin materials constituting the dispersoid 61. This makes it possible to effectively prevent the formation of defective resin particles, especially void particles, thereby enabling to obtain resin particles having small variations in size and shape. As a result, resin particles having a high degree of sphericity (that is, resin particles having a shape close to a geometrically perfect sphere) are produced relatively easily.

In particular, the temperature in the conveying portion 3 (the processing temperature (the ambient temperature) of the dispersion medium removing step) varies depending on, for example the composition of the dispersoid 61 and the dispersion medium 62 contained in the dispersion liquid 6, but usually it is preferably in the range of 0 to 50° C., more preferably in the range of 15 to 40° C. By setting the temperature in the conveying portion 3 to a value within the above range, it is possible to remove the dispersion medium 62 from the droplets 6A efficiently while preventing undesirable degeneration of the resin material constituting the resin particles 9 to be obtained. As a result, productivity of a toner becomes especially excellent, in addition, it is also possible to more smoothly promote the formation of resin particles 9, which contributes to the reduction in size of the toner production apparatus 1.

Further, it is also preferred that the temperature in the conveying portion 3 (the processing temperature of the dispersion medium removing step) and the glass transition point of the resin material constituting the dispersoid 61 satisfy the relation as indicated below. Namely, when the temperature in the conveying portion 3 into which the droplets 6A are ejected (the processing temperature of the dispersion medium removing step) is defined as $T_1$ (° C.) and the glass transition point of the resin material constituting the dispersoid 61 is defined as $T_g$ (° C.) it is preferred that $T_1$ and $T_g$ satisfy the relation: $0 \leq T_g - T_1 \leq 70$, more preferably satisfy the relation: $0 \leq T_g - T_1 \leq 60$, even more preferably satisfy the relation; $0 \leq T_g - T_1 \leq 30$, most preferably satisfy the relation: $5 \leq T_g - T_1 \leq 26$. By allowing $T_1$ and $T_g$ to satisfy the above relation, it is possible to prevent the agglomeration between the dispersoid 61 (that is, between the fine particles derived from the dispersoid 61) contained in the droplets 6A more reliably. Further, it is also possible to remove the dispersion medium 62 from the droplets 6A effectively while preventing undesirable degeneration of the resin material constituting the resin particles 9 to be obtained. As a result, productivity of a toner becomes especially excellent. In this regard, It is to be noted that in a case where the dispersoid 61 is composed of two or more kinds of the resin materials (resin components), the weighted average (weight basis) of glass transition point of each of the components is defined as $T_g$.

In the toner production apparatus shown in FIG. 1, pressure controlling means 12 for adjusting the pressure in the housing 31 is connected to the housing 31 through a connecting pipe 121. By adjusting the pressure in the housing 31, it is possible to remove the dispersion medium 62 from the droplets 6A efficiently. As a result, productivity of a toner is improved. Further, a diameter expansion portion 122 is formed in the vicinity of the end portion of the connecting pipe 121 at a side which is connected to the housing 31, and a filter 123 for preventing the resin particles 9 and the like from being sucked into the pressure controlling means 12 is provided in the end of the diameter expansion portion 122.

The pressure in the housing 31 is not limited to any specific value, but is preferably 150 kPa or less, more preferably in the range or 100 to 120 kPa, even more preferably in the range of 100 to 105 kPa. By setting the pressure in the housing 31 to a value within the above range, it is possible to remove the dispersion medium 62 from the droplets 6A smoothly while preventing undesirable degeneration of the resin constituting the resin particles 9 sufficiently.

As described above, in each of the droplets 6A a single fine particle derived from the dispersoid 61 forms one resin particle 9 substantially as it is by removing the dispersion medium 62 from the droplet 6A of the dispersion liquid 6 in the conveying portion 3, but the resin particles 9 are not limited to those obtained in such a manner. For example, in a case where the dispersoid 61 contains a precursor of a resin material (e.g. a monomer, a dimer or an oligomer of the resin material described above), the resin particles 9 may be obtained by allowing polymerization reaction to proceed while the dispersion medium 62 is removed in the conveying portion 3. In other words, the constituent material of the resin particles 9 may be substantially the same as or different from the constituent material of the dispersoid 61.

Further, voltage apply means 8 for applying a voltage to the inner surface of the housing 31 is connected to the housing 31. By applying a voltage of the same polarity as the droplets 6A of the dispersion liquid 6 and the resin particles 9 to the inner surface of the housing 31 by the use of the voltage apply means 8, it is possible to obtain such effects as described below.

Generally, the toner particles or the resin particles 9 as intermediates of the toner particles are positively or negatively charged. Therefore, when there is any charged matter of polarity opposite to that of the resin particles 9 and the droplets 6A, the phenomenon in which the resin particles 9 are electrostatically attracted and adhered to the charged matter occurs. On the other hand, when there is any charged matter of the same polarity as that of the resin particles 9 and the droplets 6A, the charged matter and the resin particles 9 repel each another, thereby effectively preventing the phenomenon in which the resin particles 9 are adhered to the surface of the charged matter. For this reason, by applying a voltage of the same polarity as that of the resin particles 9 and the droplets 6A to the side of the inner surface of the housing 31, it is possible to effectively prevent the resin particles 9 and the droplets 6A from being adhered to the inner surface of the housing 31. As a result, it is also possible to effectively prevent the formation of defective toner particles as well as to improve the collection efficiency of the resin particles 9.

The housing 31 further includes a reduced-diameter portion 311 in the bottom portion thereof. In the reduced-diameter portion 311, the inner diameter thereof is reduced toward the lower side in FIG. 1. By providing such a reduced-diameter portion 311, it is possible to collect the resin particles 9 efficiently. In this regard, the dispersion liquid 6 (droplets 6A) ejected from the nozzle 23 has already become solidified to form the resin particles 9 in the vicinity of the reduced-diameter portion 311. Therefore, even if the particles come in contact with each other in the vicinity of the reduced-diameter portion 311, the problem of agglomeration between the particles hardly arises.

A collection portion 5 is connected to the end of such a reduced-diameter portion 311. The resin particles 9 obtained by solidifying the droplets of the dispersion liquid 6, that is the resin particles 9 obtained by removing the dispersion medium 62 from the droplets 6A are collected in the collection portion 5.

The processing time of the dispersion medium removing step described above (that is, the time between the injection of the droplets of the dispersion liquid 6 and the collection of the agglomerates 9 in the collection portion 5) is preferably in the range of 5 to 120 seconds, more preferably in the range of 5 to 60 seconds, even more preferably in the range of 5 to 20 seconds. By setting the processing time of the dispersion medium removing step to a value within the above range, it is possible to improve the productivity of a toner sufficiently while preventing undesirable degeneration of the resin material constituting the resin particles 9 to be obtained.

The thus obtained resin particles 9 may be subjected to various treatments such as aeration, vacuum deaeration (reduced-pressure deaeration), and heating. By subjecting the resin particles 9 to aeration, it is possible to reduce the amount of the dispersion medium remaining in the resin particles 9 (e.g., the amount of water contained in the resin particles 9).

The amount of water contained in the resin particles 9 (that is, the water content of the resin particles 9) is not limited to any specific value, but is preferably 15 wt % or lees, more preferably in the range of 0.1 to 12 wt %, even more preferably in the range of 0.2 to 10 wt %. If the amount of water contained in the resin particles 9 is too much, there is a possibility that it becomes difficult to reduce the amount of water contained in the finally obtained toner particles sufficiently. If the toner particles contain a relatively large amount of water, there is a possibility that the problem of instability in electrification will arise. If the amount of water contained in the resin particles 9 is reduced more than necessary in this step, deterioration and degeneration of the constituent material of the resin particles 9 is likely to occur.

As describe above, in the present invention, the dispersion liquid 6 in which the dispersoid 61 containing a resin material is finely dispersed in the dispersion medium 62 is ejected from the nozzle 23 to form the droplets 6A, and then the dispersion medium 62 is removed from the droplets 6A while conveying the droplets 6A in an air flow in the conveying portion 3, whereby obtaining the resin particles 9.

In the present invention, agglomeration and granulation of the dispersoid 61 in the droplets 6A can be prevented by applying the granulation prevention agent 14 to the droplets 6A. Further, by removing the dispersion medium 62 from the droplets 6A, it is possible to allow each fine particle derived from the dispersoid 61 contained in the droplets 6A to form each of the resin particles 9. Therefore, it becomes possible to obtain the resin particles 9 having a uniform shape and a narrow particle size distribution only by making the dispersoid 61 have a uniform shape and a narrow particle size distribution.

Further, when droplets are formed by an ink jet method, there is a case that not only main-droplets but also sub-droplets are produced subsequent to the main-droplets. In this regard, the diameter of the sub-droplet is smaller than the necessary diameter of the main-droplet. According to the present invention, it is possible to reduce the adverse effect caused by the sub-droplets sufficiently. Namely, in the present invention, even in the case of such a sub-droplet, an agglomeration between fine particles derived from the dispersoid 61 can be prevented so that each of the resin particles 9 is formed from an individual fine particle derived from the dispersoid 61, thereby enabling to make the adverse effect caused by the sub-droplets sufficiently small.

Further, since each of the resin particles 9 can be formed from an, individual fine particle derived from the dispersoid 61, it is possible to obtain the resin particles 9 having excellent mechanical strength without exposing the fine particles to a temperature higher than the melting point of the fine particles. Further, it is also possible to prevent undesirable degeneration of the resin material constituting the resin particles 9.

Furthermore, since each of the resin particles 9 can be formed from an individual fine particle derives from the dispersoid 61, it is possible to remove the dispersion medium 62 from the droplets 6A quickly without exposing the droplets 6A to the high temperature, thereby enabling to prevent the formation of defective particles and void particles.

When necessary, the thus obtained resin particles 9 (toner) may be subjected to various treatments such as aeration, classification, and external addition.

When classification is carried out a screen, an air classifier and the like can be used.

Examples of an external additive for use in external addition include fine particles composed of inorganic materials such as silica, metal oxides (e.g., aluminum oxide, titanium oxide, strontium titanate, cerium oxide, magnesium oxide, chromium oxide, titania, zinc oxide, alumina, and magnetite), nitrides such as silicon nitride, carbides such as silicon carbide, calcium sulfate, calcium carbonate, and aliphatic metal salts, fine particles composed of organic materials such as acrylic resins, fluorocarbon resins, polystyrene resins. polyester resins, aliphatic metal salts, and fine particles composed of a composite of two or more of them.

In addition, fine particles obtained by subjecting the fine particles mentioned above to surface treatment can also be used as external additives. Surface treatment is carried out using, for example, HMDS, silane-based coupling agents. titanate-based, coupling agents, fluorine containing silane-based coupling agents, or silicone oil.

The toner of the present invention produced In such a manner as described above has a uniform particle shape and a small (narrow) particle size distribution. Particularly, according to the present invention, it is possible to obtain toner particles having a shape close to a true sphere.

Specifically, the toner (the toner particles) preferably has an average roundness R represented by the following formula (I) of 0.95 or higher, more preferably 0.96 or higher, even more preferably 0.97 or higher, most preferably, 0.98 or higher:

$$R=L_0/L_1 \quad (I)$$

wherein $L_1$ (μm) represents the circumference of projected image of a toner particle that is subject of measurement, and $L_0$ (μm) represents the circumference of a perfect circle (a geometrically perfect circle) having the same area as that of the projected image of the toner particle that is a subject of measurement. When the average roundness R is 0.95 or higher, the transfer efficiency of the toner is further improved.

Further, the toner preferably has a standard deviation of average roundness among particles of 0.02 or less, more preferably 0.015 or less, even more preferably 0.01 or less. When the standard deviation of average roundness among particles is 0.02 or less, variations in electrification properties, fixing properties, etc are especially small, thereby further improving the reliability of the toner as a whole.

The average particle diameter (volume basis) of the toner is preferably in the range of 1 to 9 μm, more preferably in the range of 2 to 6 μm. If the average particle diameter of the toner is less than the above lower limit value, it is difficult to uniformly electrify the toner, and the adherence of the toner to the surface of an electrostatic latent image holder (e.g., a photoreceptor) is increased, thus resulting in a case where the amount of a remaining toner after transfer is increased. On the other hand, if the average particle diameter of the toner exceeds the above upper limit value, reproducibility of the edge portion in an image formed using the toner, especially character images or light patterns, in development is lowered.

Further, the toner preferably has a standard deviation of particle diameter among particles of 1.5 μm or less, more preferably 1.3 μm or less, even more preferably 1.0 μm or less. When the standard deviation of particle diameter among particles is 1.5 μm or less, variations in electrification properties, fixing properties, etc are especially small, thereby further improving the reliability or the toner as a whole.

Further, the toner preferably has a bulk density of equal to or more than $0.34$ g/cm$^3$, more preferably in the range of $0.35$ to $0.50$ g/m$^3$. By setting the bulk density of the toner to a value in the above range it is possible to improve properties of the toner such as durability, transfer efficiency and the like. In addition, the amount of the toner to be packed in a cartridge is increased even in a case where the volume of the cartridge is the same as before. Further, such an increased bulk density of the toner is advantageous to the reduction in size of a cartridge.

The amount of water contained in the toner particles (the water content of the toner particles) is not limited to any specific value, but is preferably 5 wt % or less, more preferably in the range of 0.01 to 4 wt %, even more preferably in the range of 0.02 to 1 wt %. If the amount of water contained in the toner particles is too much, there Is a possibility that a problem of instable electrification will arise. In this regard, it is to be noted that it is not necessary to reduce the amount of water obtained in the toner particles more than necessary. This is because an attempt to reduce the amount of water contained in the toner particles to an extremely low level tends to cause the deterioration or undesirable degeneration of the constituent material of the toner.

Although the present invention has been described with reference to the preferred embodiments, the present invention is not limited thereto.

For example, although the granulation prevention agent is applied to the ejected dispersion liquid (droplets) in the above embodiment, the present invention is not limited thereto. The granulation prevention agent may be added to the dispersion liquid before being ejected. Namely, the, resin particles may be obtained by ejecting the dispersion liquid containing the granulation prevention agent. This makes it possible to prevent the dispersoid in the dispersion liquid before being ejected from being agglomerated and granulated with each other. In addition, the granulation prevention agent can be contained in the ejected dispersion liquid more reliably, thus making it possible to prevent the dispersoid in the ejected dispersion liquid from being agglomerated and then granulated with each other more effectively.

Further, it is possible to make various changes and additions to each portion of the toner production apparatus, so long as the same functions are achieved.

Figure 3:
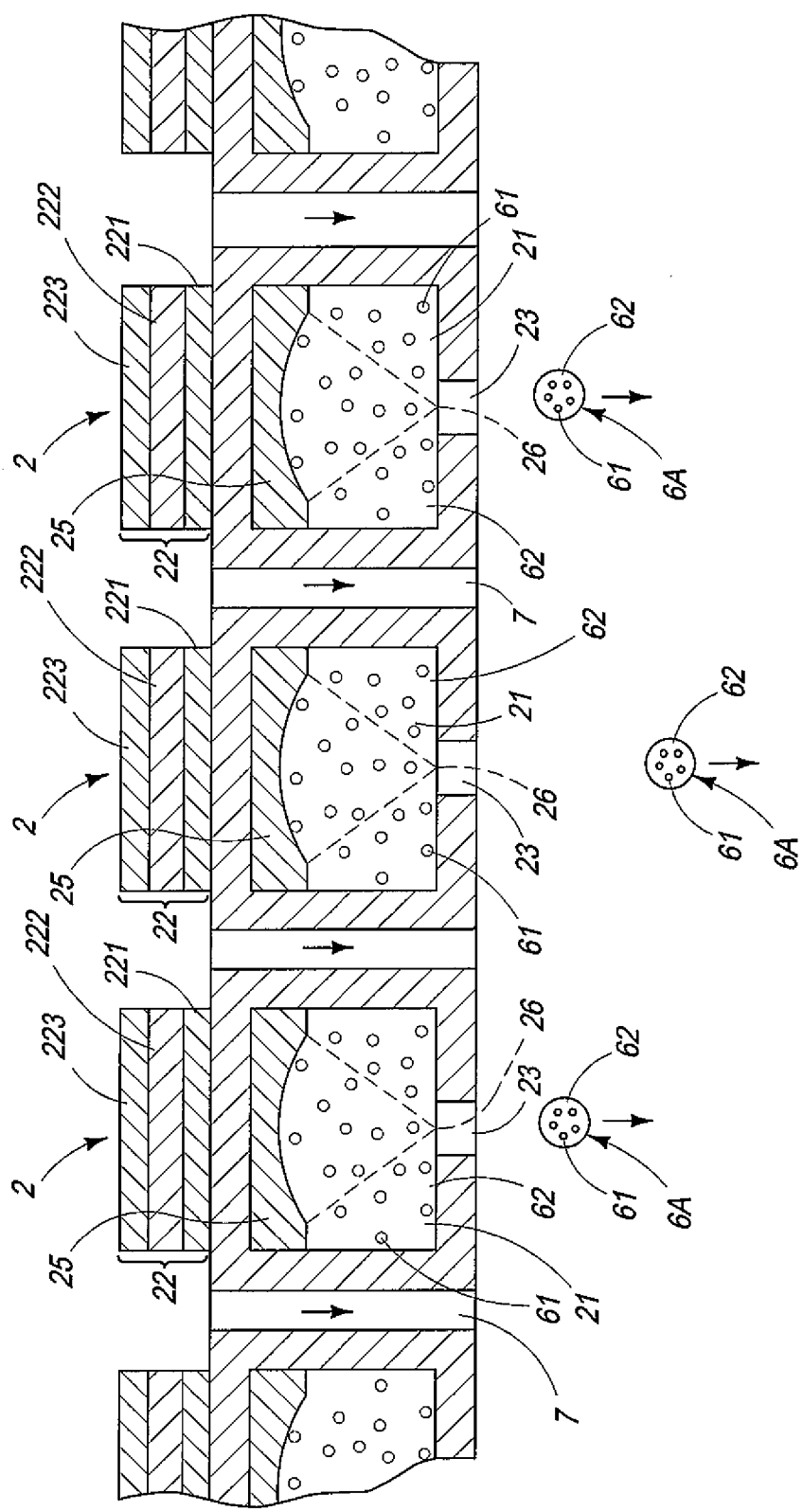
FIG. 3 is a diagram which schematically shows the structure of the vicinity of head portions of a toner production apparatus of another embodiment.

For example, the head portions as shown in FIG. 3 can be used instead of the head portions of the toner production apparatus according to the embodiment described above.

Specifically, in the head portions shown in FIG. 3, an acoustic lens (a concave lens) 25 is provided in each head portion 2. By providing such an acoustic lens 25, it is possible to converge a pressure pulse (vibration energy) generated by a piezoelectric device 22 at a pressure pulse convergence portion 26 provided in the vicinity of each nozzle 23. Therefore, vibration energy generated by the piezoelectric device 22 is efficiently used an energy for ejecting the dispersion liquid 6. Further, even when the dispersion liquid 6 stored in the dispersion liquid storage portion 21 has a relatively high viscosity, the dispersion liquid 6 is ejected from the nozzle 23 reliably. Furthermore, even when the dispersion liquid 6 stored in the dispersion liquid storage portion 21 has a relatively large cohesive force (surface tension), the dispersion liquid 6 is ejected in the form of fine droplets. As a result, it is possible to obtain resin particles 9 having a relatively small particle diameter easily and reliably.

As described above, by the use of the head portion as shown in FIG. 3, it is possible for the resin particles 9 to have desired shape and size, even when a material having a relatively high density or a material having a relatively large cohesive force is used as the dispersion liquid 6. This particularly extends the range of material choices, thereby enabling to produce a toner having desired properties easily.

Further, by the use of the head portions as shown in FIG. 3, since the dispersion liquid 6 is ejected using a convergent pressure pulse, the dispersion liquid 6 in the form of droplets each having a relatively small size can be ejected, even in a case where the area (the area of an opening) of the ejecting portion 23 is relatively large. In other words, even in a case where it is desired that the finally obtained toner particles have a relatively small particle diameter, the area of the nozzle 23 may be large, thereby preventing the occurrence of clogging in the nozzle 23 more effectively even when the dispersion liquid 6 has a relatively high viscosity.

In this regard, although in the head portions as shown in FIG. 3, a concave Lens is used as the acoustic lens, the acoustic lens is not limited thereto. For example, a fresnel lens or an electronic scanning lens may also be used as an acoustic lens.

Figure 4:
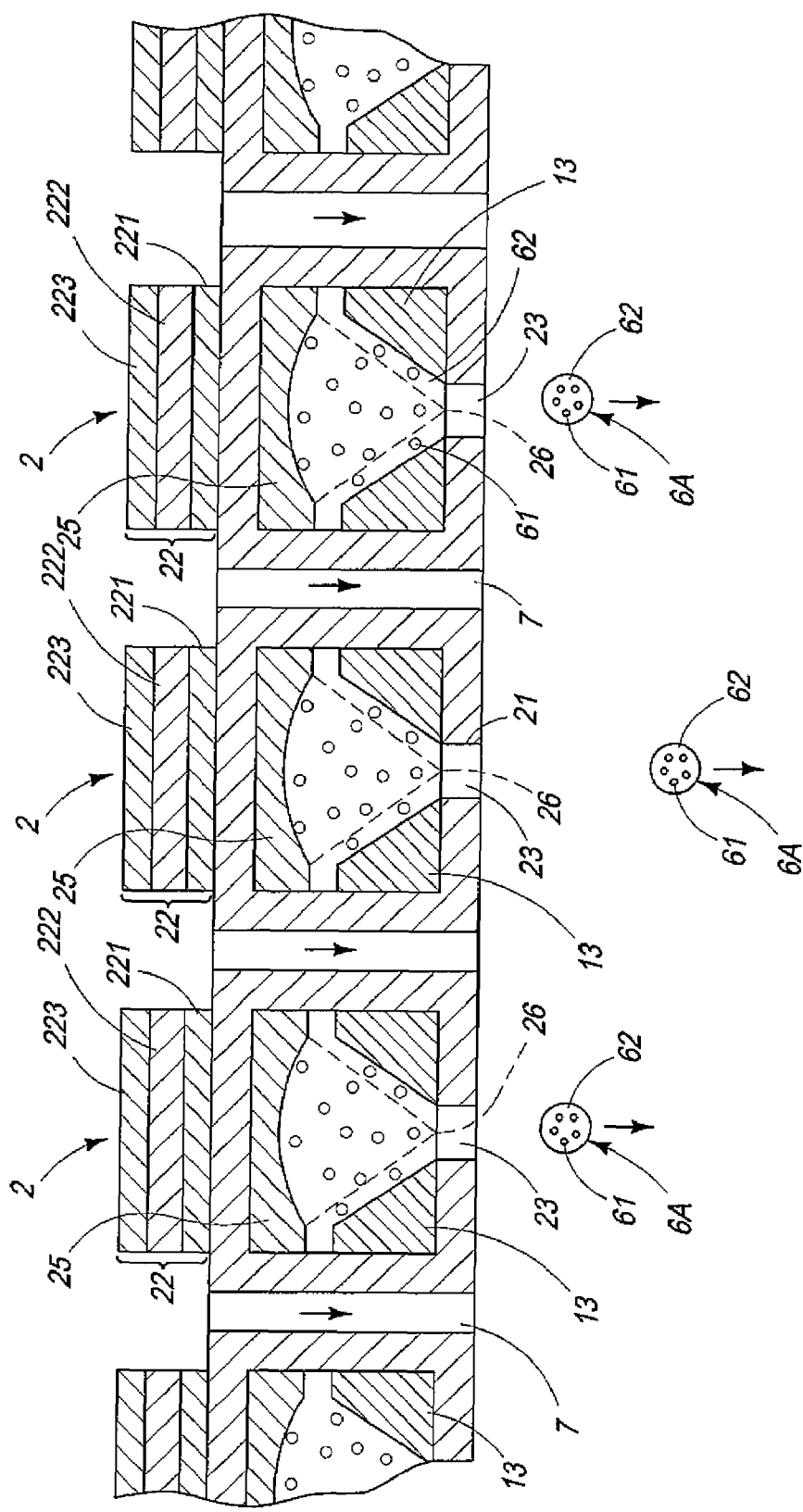
FIG. 4 is a diagram which schematically shows the structure of the vicinity of head portions of a toner production apparatus of other embodiment.
Figure 5:
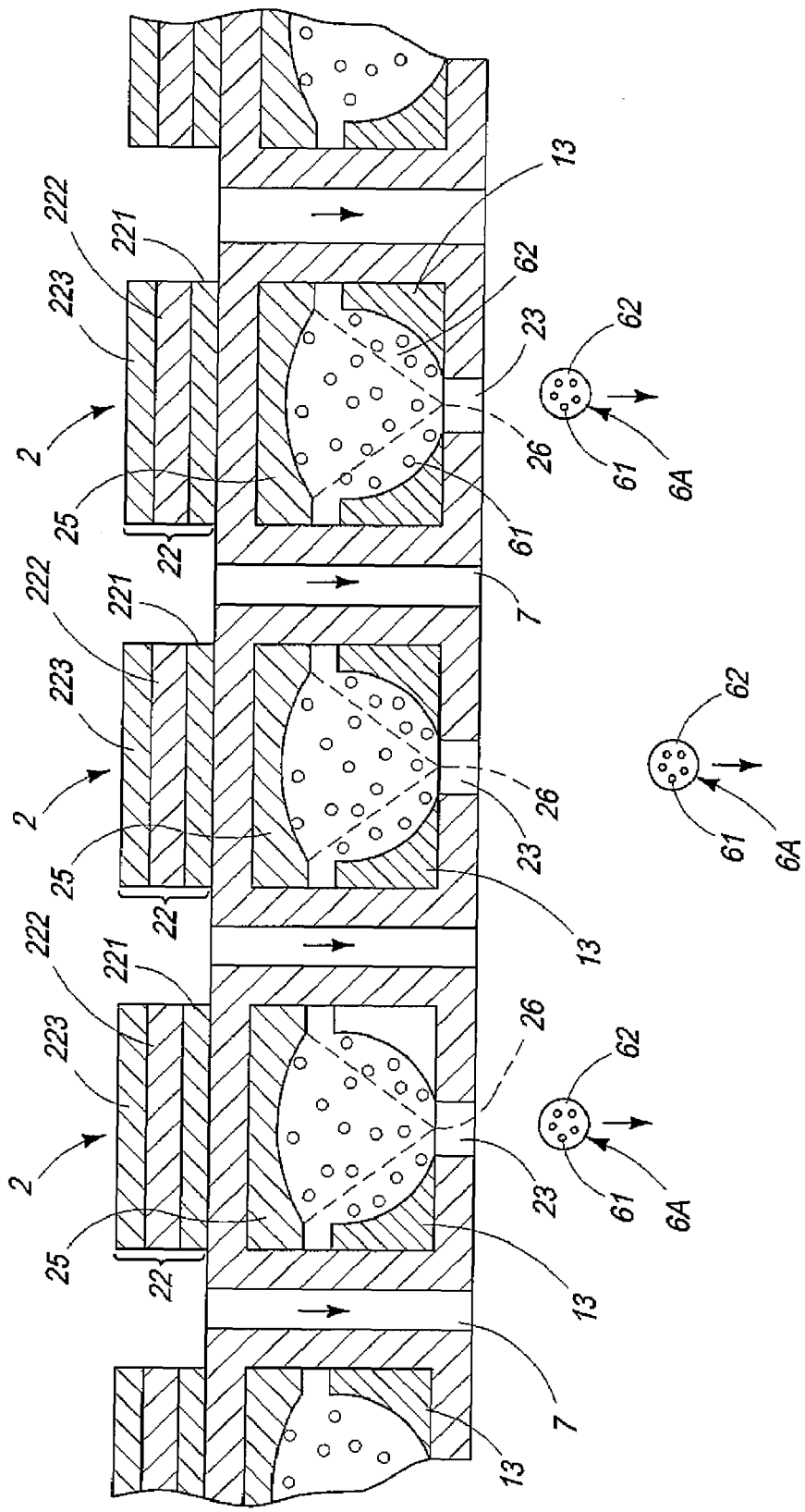
FIG. 5 is a cross-sectional view which schematically shows the structure of the vicinity of head portions of a toner production apparatus of the other embodiment.
Figure 6:
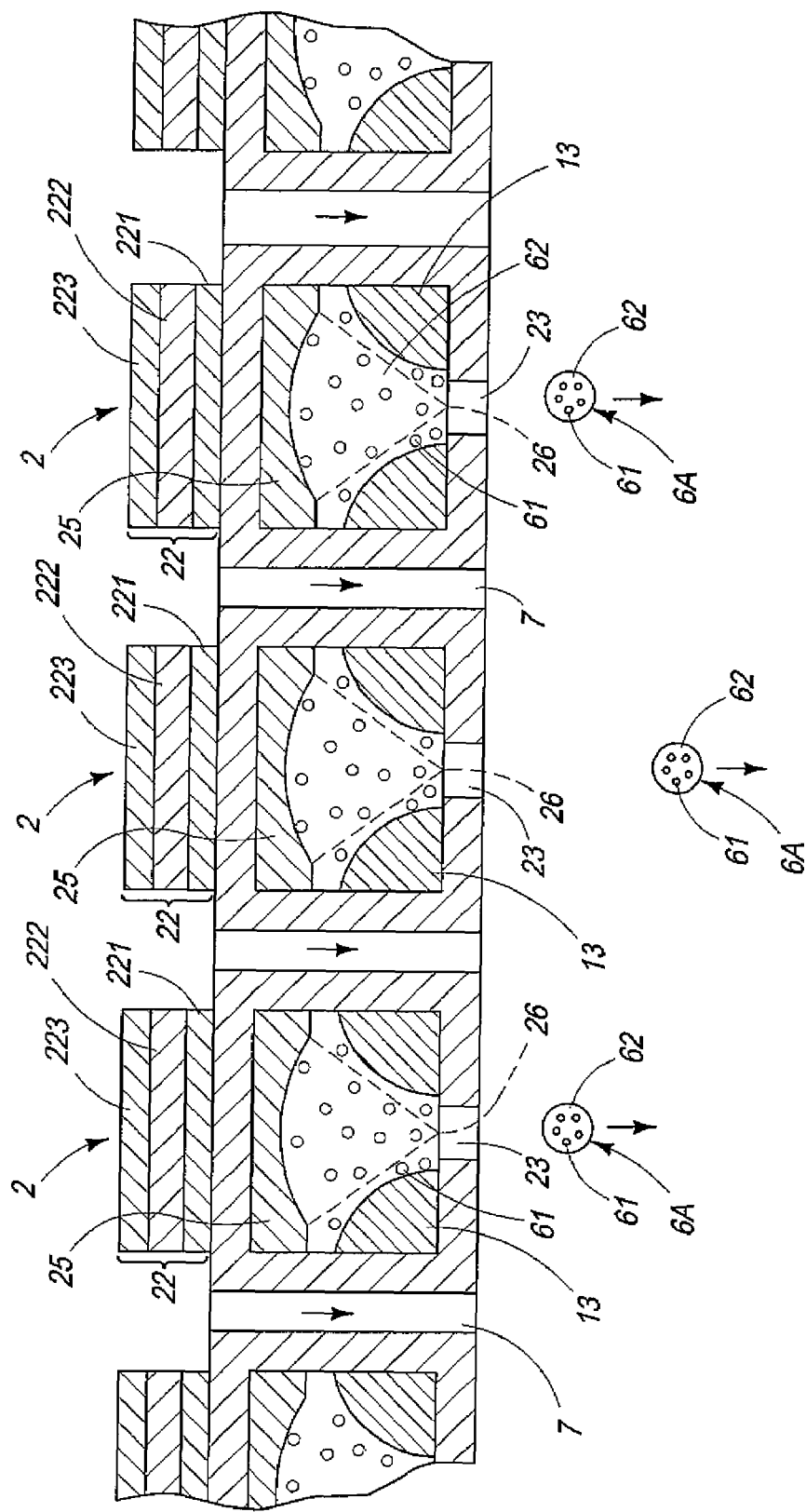
FIG. 6 is a cross-sectional view which schematically shows the structure of the vicinity of head portions of a toner production apparatus of yet other embodiment.

Further, head portions as shown in FIG. 4 to FIG. 6 can be used instead of the head portions of the toner production apparatus in the above embodiment.

Figure 7:
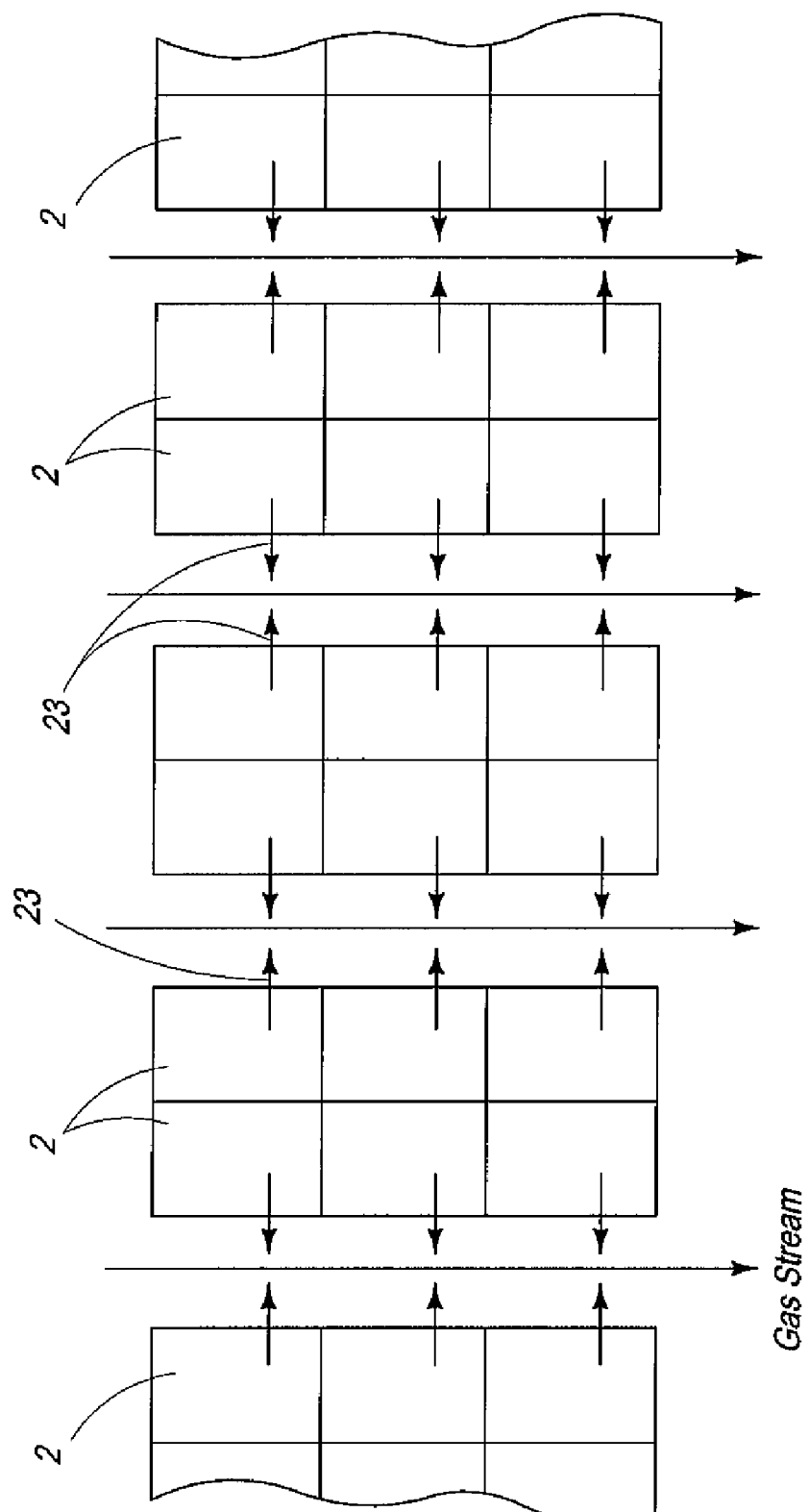
FIG. 7 is a cross-sectional view which schematically shows the structure of the vicinity of head portions of a toner production apparatus of yet other embodiment.

In particular, a focusing member 13 having a shape convergent toward the nozzle 23 may be provided between the acoustic lens 25 and the nozzle 23, as shown in FIGS. 4 to 6. (vibration energy) generated by the piezoelectric device 22, and therefore the pressure pulse generated by the piezoelectric device 22 is utilized more efficiently. Further, although each of the embodiments described above has a structure in which the droplets of the dispersion liquid are ejected in a vertically downward direction, the dispersion liquid may be ejected in any direction (e.g., a vertically upward direction or a horizontal direction). Further, as shown in FIG. 7, the dispersion liquid 6 may be ejected in such a manner that the direction of the dispersion liquid 6 becomes substantially vertical to the direction of the gas injected from the gas injection opening 7. In this case, the gas stream changes the traveling direction of the ejected droplets of the dispersion liquid 6 so that they are conveyed in a direction at a substantially right angle to the direction that the nozzle 23 ejects the dispersion liquid 6.

Further, although each of the embodiments described above has a structure in which the dispersion liquid is intermittently ejected from the head portions by the use of a piezoelectric pulse, the dispersion liquid may be ejected (discharged) according to other methods. For example, the so-called Bubble Jet method ("Bubble Jet" is a trademark) and the like may be employed. As a method using the so-called Bubble Jet method ("Bubble Jet" is a trademark), a method disclosed in Japanese Patent Application No. 2002-169348 can be mentioned. In this method, a dispersion liquid is intermittently ejected from a head portion by the use of changes in volume of gas.

Moreover, although in each of the embodiments, the method for producing toner particles has been described by way of example, the method of the present invention can also be applied to resin particles other than toner particles.

For example, the method of the present invention can be applied to a powdered paint. In a case where a powdered paint is produced by the method for producing the resin particles according to the present invention, a paint coating formed using the powdered paint has extremely excellent smoothness with little defect such as a pinhole, flaking or the like.

EXAMPLES (1) Production of Toner

Example 1

First, 100 parts by weight of an epoxy resin (a modified epoxy resin, glass transition point Tg: 70° C., melting point Tm: 110° C. manufactured by Arakawa Chemical Industries, LTD.) as a binder resin. 5 parts by weight of a phthalocyanine pigment (phthalocyanine blue, manufactured by Dainichiseika Color & Chemicals Mfg. Co., Ltd.) as a coloring agent, and 300 parts by weight of tetrahydrofuran (manufactured by Wako Pure Chemical Industries, Ltd) as a solvent were prepared.

These components were mixed and dispersed using a ball mill for 10 hours to prepare a resin solution (a resin liquid).

At the same time, 10 parts by weight of sodium polyacrylate (average degree of polymerization n=2,700 to 7,500, manufactured by Wako Pure Chemical Industries, Ltd.) as a dispersant was dissolved in 590 parts by weight of ion-exchange water to prepare an aqueous solution.

Next, 600 parts by weight of the aqueous solution was poured into a 3-liter round-bottom stainless container, and then 409 parts by weight of the binder resin solution was added drop by drop for 10 minutes under stirring at 4,000 rpm with a T.K. Homomixer (manufactured by Tokushu Kika Kogyo Co., Ltd.). At this time, the temperature of the liquid in the stainless container was maintained at 70° C. After the completion of dropping of the binder resin solution. The resulting mixture was further stirred for 10 minutes while the temperature of the mixture was maintained at 70° C. to thereby obtain an emulsion.

Next, tetrahydrofuran contained in the emulsion (the dispersoid) was removed at 45° C. and at an ambient pressure of 10 to 20 kPa. ,Thereafter. the emulsion was cooled to room temperature, and then ion-exchange water was further added to obtain a resin dispersion liquid in which fine particles containing an epoxy resin were dispersed.

Then, the obtained resin dispersion liquid was placed In an atmosphere with a pressure of 14 kPa for 10 minutes under stirring to carry out deaeration treatment. At this time, the ambient temperature was 25° C. The thus obtained rosin dispersion liquid had a solid (dispersoid) concentration of 10 wt %. The viscosity of the resin dispersion liquid at 25° C. was 150 mPa·s. The average particle diameter Dm of the dispersoid constituting the resin dispersion liquid was 5 μm. In this connection, it is to be noted that the average particle diameter of the dispersoid was measured using a laser diffraction/scattering type particle size distribution analyzer (LA-920, manufactured by HORIBA, Ltd.)

The deaerated resin dispersion liquid was fed into a dispersion liquid supply portion of a toner production apparatus as shown in FIG. 1 and FIG. 2. The dispersion liquid in the dispersion liquid supply portion was stirred with stirring means, and was supplied to a dispersion liquid storage portion provided in each head portion by the use of a metering pump. Then, the dispersion liquid stored in the dispersion liquid storage portions was ejected through nozzles into a conveying portion. Each of the nozzles was formed into a circular opening having a diameter of 12 μm. It is to be noted that the vicinity of the nozzle of each of the head portion had been coated with a fluorocarbon resin (polytetrafluoroethylene) so as to have hydrophobicity.

The dispersion liquid was erected in the form of droplets under the conditions where the temperature of the dispersion liquid in the head portions was 25° C., the frequency of a piezoelectric element was 10 kHz, the initial velocity of the dispersion liquid at the time when the dispersion liquid was ejected from the nozzles was 4 m/sec. and the amount of the dispersion liquid per droplet elected from the head portions was 1.5 pl (diameter Dd: 8 μm). Although the toner production apparatus had two or more head portions, the dispersion liquid was ejected In such a manner that the timing of ejection was different in at least adjacent head portions.

Further, when the dispersion liquid was ejected in the form of droplets, air having a temperature of 40° C. and a humidity of 27% RH was injected from gas injection openings in a vertically downward direction at a flow rate of 4 m/sec. The pressure (the ambient pressure) in a housing was adjusted to 100 to 105 kPa. The temperature (the ambient temperature) in the housing was adjusted to 40 to 60° C. The length of the solidifying portion (the length of the conveying portion in a direction that the dispersion liquid Is conveyed) was 2 m.

The granulation prevention agent was Injected to the ejected dispersion liquid in the cooled area by the granulation prevention agent supply means as shown In FIG. 1. In this regard, silica halving an average particle diameter of 50 nm that has been Subjected to hydrophilic treatment was used as the granulation prevention agent. Further, the granulation prevention agent was infected so that the amount of the granulation prevention agent was contained in the finally obtained toner powder was 0.5 wt %.

In the conveying portion, the dispersion medium was removed from the ejected dispersion liquid to form resin particles of the dispersoid (fine particle), and then the formed resin particles were collected in a collection portion (this is, a dispersion medium removing step). Further, the processing time of the dispersion medium removing step (that is, the time required to pass through the conveying portion) per each particle (each droplet or each resin particle formed from the droplet) was 12 seconds. The amount of water contained in the obtained agglomerates was 5 to 10 wt %. It is to be noted that the amount of water was measured according to Karl Fischer technique.

Thereafter, the obtained resin particles were subjected to aeration for 1 hour while being heated at 50° C. to reduce the amount of water contained in the resin particles to about 0.5 wt %.

The obtained toner particles had a water content of 0.3 to 0.5 wt %, an average roundness R of 0.989, and, a standard deviation of roundness of 0.010, an average particle diameter (volume basis) of 5.5 μm, and a standard deviation of particle diameter (volume basic) was 0.8 μm. In this connection, it is to be noted that the roundness was measured in a water suspension system by the use of a flow system particle image analyzer (FPIA-2000, manufactured by Toa Iyodensi Co.). The roundness R was determined by the following formula (I):

$$R = L_0/L_1 \quad (I)$$

where $L_1$ (μm) represents the circumference of projected image of a particle that is a subject of measurement, and $L_0$ (μm) represents the circumference of a perfect circle having the same area as that of the projected image of the particle that is a subject of measurement.

Example 2

A toner was produced in the same manner as in Example 1 except that the resin was changed to a styrene-acrylic ester copolymer (glass transition point Tg: 52° C., melting point Tm: 105° C.).

Example 3

A toner was produced in the same manner as in Example 1 except that the granulation prevention agent was changed to titanium oxide having an average particle diameter of 30 nm which had been subjected to hydrophilic treatment, and it was injected so that the amount of the granulation prevention agent contained in the finally obtained toner powder was 1.0 wt %.

Example 4

A toner was produced in the same manner as in Example 3 except that the resin was changed to a styrene-acrylic ester copolymer (glass transition point Tg: 52° C., melting point Tm: 105° C.).

Example 5

A toner was produced in the same manner as in Example 1 except that the granulation prevention agent was applied to the deaerated resin dispersion liquid so that the amount of the granulation prevention agent contained in the deaerated resin dispersion liquid was 0.1 wt %, instead of injecting the granulation prevention agent.

Comparative Example 1

A toner was produced in the same manner as in Example 1 except that the application of the granulation prevention agent was not carried out.

Comparative Example 2

A toner was pruduced in the in same manner as in Example 1 except that resin particles were obtained in the following manner. Agglomerates each formed from a plurality of fine particles derived from the dispersoid having an average particle diameter of 0.2 μm in the resin dispersion liquid were obtained and then they were subjected to heat treatment by the toner production apparatus shown in FIG. 1 without applying the granulation prevention agent to thereby obtain the resin particles.

The heat treatment was carried out using Surfusing System (SYS-3 model, manufactured by Nippon Pneumatic Mfg. Co., Ltd.) under the conditions where the processing temperature (the temperature of hot-air) was 70° C., the volume of hot-air was 1 m³/min, the volume of distribution air was 0.1 m³/min, the feeding rate of a raw material was 0.5 kg/hr, and the volume of suction air was 10 m³/min. The processing time per each agglomerate (each particle) was 3 seconds. In this manner, fine particles constituting the agglomerates were fused and bonded with each other to form resin particles.

The toner production conditions of each of Examples 1 to 5 and Comparative Examples 1 and 2 (hereinafter, referred to as each of Examples and each of Comparative Examples) are shown in the following Table 1.

TABLE 1

| | Dispersion Liquid | | Average Particle | | Granulation Prevention Agent | | | Resin particles | | | Standard |
|---|---|---|---|---|---|---|---|---|---|---|---|
| | Constituent Resin | Average Particle Diameter Dm [μm] | Diameter of Droplets Dd [μm] | Dm/Dd | Type | Average Particle Diameter Dc [μm] | Dc/Dm | Average Roundness R | Standard Deviation of Roundness | Average Particle Diameter [μm] | Deviation of Particle Diameter [μm] |
| Ex. 1 | Epoxy Resin | 5.0 | 8.0 | 0.63 | Silica | 0.05 | 0.01 | 0.989 | 0.010 | 5.5 | 0.8 |
| Ex. 2 | Styrene-Acrylic Ester Copolymer | 4.0 | 6.0 | 0.67 | Silica | 0.05 | 0.0125 | 0.991 | 0.009 | 4.3 | 0.6 |
| Ex. 3 | Epoxy Resin | 5.0 | 8.0 | 0.63 | Titanium Oxide | 0.03 | 0.006 | 0.983 | 0.015 | 5.4 | 0.7 |
| Ex. 4 | Styrene-Acrylic Ester Copolymer | 4.0 | 6.0 | 0.67 | Titanium Oxide | 0.03 | 0.0075 | 0.980 | 0.013 | 4.5 | 0.6 |
| Ex. 5 | Epoxy Resin | 5.0 | 8.0 | 0.63 | Silica | 0.05 | 0.01 | 0.990 | 0.010 | 5.5 | 0.8 |
| Ex. 6 (powdered paint) | Epoxy Resin | 5.0 | 8.0 | 0.63 | Silica | 0.05 | 0.01 | 0.989 | 0.010 | 5.2 | 0.6 |
| Ex. 7 (powdered paint) | Epoxy Resin | 5.0 | 8.0 | 0.63 | Silica | 0.05 | 0.01 | 0.990 | 0.010 | 5.5 | 0.8 |
| Com. Ex. 1 | Epoxy Resin | 5.0 | 8.0 | 0.63 | — | — | — | 0.910 | 0.020 | 7.1 | 1.3 |
| Com. Ex. 2 | Epoxy Resin | 0.2 | 8.0 | 0.025 | — | — | — | 0.975 | 0.021 | 6.2 | 1.2 |
| Com. Ex. 3 (powdered paint) | Epoxy Resin | 5.0 | — | — | — | — | — | 0.910 | 0.028 | 7.6 | 1.5 |

(2) Evaluation

For each of the toners obtained in Examples and Comparative Examples, the ratio of void particles contained in the toner, durability and transfer efficiency were evaluated.

(2.1) Ratio of Void Particles

The internal structure of the toner particles of each of the toners obtained in Examples 1 to 5 and Comparative Examples 1 to 2 was observed using a transmission electron microscope (TEM), and then the ratio of void particles contained in the toner was evaluated according to the following four criteria A: No void particle was observed.

B: Few void particles were observed, but the ratio thereof was less than 1%.

C: The ratio of void particles was 1% or higher but less than 3%.

D: The ratio of void particles was 3% or higher.

Further, for each of the toners obtained in Examples and Comparative Examples, bulk density was measured using a bulk specific gravity measuring apparatus (JIS-K5101, manufactured by Tsutsui Rikagaku Kikai CO., LTD.) as indexes of the presence of the void particles.

(2.2) Durability

The toner obtained in each of Examples 1 to 5 and Comparative Examples 1 to 2 was set in a developing device of a color laser printer (LP-2000C, manufactured by Seiko Epson Corporation). Then, the developing device was continuously rotated with nothing being printed out. After a lapse of 12 hours, the developing device was taken out of the printer to visually observe the evenness of a thin layer of the toner formed on the developing roller, and than The durability of the toner was evaluated according to the following four criteria.

A: No irregularity was observed in the thin layer.

B: Almost no irregularity was observed in the thin layer.

C: Irregularity was observed to some extent in the thin layer.

D: Irregularity was clearly observed as stripes in the thin layer.

(2.3) Transfer Efficiency

For each of the toners obtained in Examples 1 to 5 and Comparative Examples 1 to 2, transfer efficiency was evaluated. The transfer efficiency was evaluated using a color laser printer (LP-2000C, manufactured by Seiko Epson Corporation) in a manner described below.

A toner on a photoreceptor was collected using a tape just after the developing step was completed (that is, prior to transfer), and the toner remaining on the photoreceptor was collected using another tape after transfer (that is, after printing). The weight of each of the collected toners was measured. The transfer efficiency was determined using the formula: $(W_b - W_a) \times 100/W_b$, where $W_b$ (g) represents the weight of a toner on a photoreceptor prior to transfer and $W_a$ (g) represents the weight of the toner remaining on the photoreceptor after transfer.

These evaluation results are shown in the following Table 2.

TABLE 2

| | Evaluation | | |
|---|---|---|---|
| | Ratio of Void Particles (Bulk Density) [g/cm$^3$] | Transfer Efficiency [%] | Durability |
| Ex. 1 | A (0.43) | 98.1 | A |
| Ex. 2 | A (0.46) | 98.5 | A |
| Ex. 3 | A (0.42) | 97.8 | A |

TABLE 2-continued

| | Evaluation | | |
|---|---|---|---|
| | Ratio of Void Particles (Bulk Density) [g/cm³] | Transfer Efficiency [%] | Durability |
| Ex. 4 | A (0.40) | 97.6 | A |
| Ex. 5 | A (0.39) | 98.2 | A |
| Ex. 6 | A (0.44) | — | — |
| Ex. 7 | A (0.38) | — | — |
| Com. Ex. 1 | C (0.29) | 96.5 | D |
| Com. Ex. 2 | C (0.32) | 97.1 | C |
| Com. Ex. 3 | D (0.28) | — | — |

As is clear from Table 1 and Table 2, all the toners according to the present invention (Examples 1 to 5) had a high degree of roundness, a narrow particle size distribution, and small variations in particle shape. (a small standard deviation, of roundness), and contained substantially no defective toner particles such as void particles. It is supposed that these facts result from the following reason. That is, the granulation prevention agent prevents the fine particles derived from the dispersoid from being agglomerated and then granulated with each other, thus resulting in the obtained toner which is formed from an individual fine particle derived from the dispersoid. As a result, the degree of roundness and particle size distribution of the dispersoid are reflected to those of the toners to be obtained substantially as they are.

On the other hand, In the toner of Comparative Example 1, there were many toner particles having an especially low degree of roundness and relatively large irregularities (projections). It is supposed that these facts result from the following reasons.

In the Comparative Examples 1 and 2, agglomeration of the dispersoid (that is, the fine particles derived from the dispersoid) does not uniformly occur when the dispersion medium is removed from the droplets of the dispersion liquid. Therefore, the obtained toner particles have a plurality of relatively large surface irregularities and large variations in size and shape. Further, since the dispersion medium is rapidly removed, the ratio of defective toner particles such as void particles contained in the obtained toner tends to be high.

In addition, as is clear from Table 2, the toners according to the present invention (Examples 1 to 5) had excellent transfer efficiency. In contrast, the toners according to the Comparative Examples 1 and 2 had poor transfer efficiency. It is supposed that these facts result from the following reasons. That is, the toners according to the present invention contain substantially no defective toner particles such as void particles (or even in a case where the toners contain such defective toner particles, the ratio thereof in the toner is extremely low) and have sufficiently small variations in size, shape and properties among the toner particles, while the toners according to the comparative Examples 1 and 2 have large variations in size, shape and properties among the toner particles due to a large amount of defective toner particles such as void particles contained therein. Further, the toners according to the present invention had excellent durability while the toners according to the Comparative Examples 1 and 2 had poor durability. This is also because of that the toners according to the present invention contain substantially no defective toner particles such as void particles, or even in a case where the toners contain such defective toner particles, the ratio thereof in the toner is extremely low.

(3) Production of Powdered Paint

Example 6

Resin particles were produced in the same manner as in Example 1 except that the head portion of the toner production apparatus shown in FIG. 1 was changed to a disk-typed spray drier (DCTRS-3N Type manufactured by Sakamoto Giken, LLC.), and the thus obtained resin particles were used as a powdered paint.

The dispersion liquid was ejected with compression air having a temperature of 40° C. and a pressure of 0.65 Mpa at an initial velocity of 4 m/sec. Further, the amount of the ejected dispersion liquid per minute was 20 mL and the amount of the dispersion liquid per droplet ejected from the nozzles was 1.5 pl (average diameter Dm: 8 μm).

Example 7

A powdered paint was produced in the same manner as in Example 6 except that the resin war changed to a styrene-acrylic ester copolymer (glass transition point Tg: 52° C., melting point Tm: 105° C.).

Comparative Example 3

Powdered paint was produced in the same manner as in Example 6 except that no granulation prevention agent was added, conditions of compression air used for the ejection of the dispersion liquid were changed to a temperature of 150° C. and a pressure of 0.55 Mpa, and a temperature in the conveying portion was set to 150° C.

(4) Evaluation

For each of the powdered paints obtained in the manner described above, the ratio of void particles contained in the powered paint was evaluated in the same manner as (2.1) described above.

As is clear from Table 2, the powdered paints according to the present invention (Examples 6 and 7) contain substantially no defective toner particles such as void particles.

On the other hand, in the powdered of the Comparative Example 3, there were many coating particles having relatively large irregularities (projections).

Further, the powdered paints of the Examples 6 and 7 have bulk density larger than that of the powdered paint of the Comparative Example 3, which shows the fact that the amount of detective particles such as Void particles contained in the powdered paints of the Examples 6 and 7 is fewer than that contained in the powered paint of the Comparative Example 3.

A substrate was coated with each of the powdered paints of the Examples 6 to 7 and comparative Example 3 and then appearance of each of the obtained paint coatings was visually observed. The paint coatings using the powdered paints of the Examples 6 and 7 had especially excellent smoothness and had no coating defect. In contrast, the paint coating using the powdered paint of the Comparative Example 3 did not have such a smooth surface as those using the powdered paints of the Examples 6 and 7. Further, the presence of coating defect such as a pinhole was confirmed In the paint coating using the powdered paint of the Comparative Example 3.

In this regard, it is to be noted that au the substrate described above. a mild steel plate which is electropainted with an epoxy resin-based cationic electrodeposition paint ("Bondelite #3030", manufactured by Nihon Parkerizing Co., Ltd.) and which was coated with a melamine cured polyester resin-based powdered paint for intermediate coating was used.

Further, the substrate was coated with each of the powdered paints twice under the conditions that the temperature was 25° C. and the relative humidity was in the range of 65% to 70% so that the thickness of the dried coating became 20 μm and then it was baked for 3 minutes at the temperature of 140° C. to obtain the paint coating. In this regard, the air pressure of spray gun was 5 kg/cm, the flow rate of the paint was 400 m/min and the distance between the substrate and the spray gun was 40 cm during the coating.

Finally, it is to be understood that the present invention is not limited to the Examples described above, and many changes or additions may be made without departing from the scope of the invention which is determined by the following claims.

What is claimed is:

1. A resin particles producing method using a dispersion liquid which comprises a dispersion medium and fine particles of a resin material, the fine particles being dispersed in the dispersion medium, the method comprising:
    ejecting the dispersion liquid in the form of droplets each of which contains two or more of the fine particles; and
    removing the dispersion medium from each of the ejected droplets of the dispersion liquid, to obtain resin particles which are derived from the fine particles contained in each of the droplets;
    wherein a granulation prevention agent for preventing or suppressing the fine particles from being agglomerated and granulated in each droplet is applied to the dispersion liquid during the removing the dispersion medium.

2. The resin particles producing method as claimed in claim 1, further comprising:
    mixing materials which contain at least the resin material and a solvent so that at least a part of the materials is dissolved in the solvent to obtain a resin liquid; and
    adding the resin liquid drop by drop to an aqueous solution which is a constituent of the dispersion medium under stirring so that the resin liquid is changed into the fine particles, to obtain the dispersion liquid,
    wherein the solvent is removed in the dispersion removing step to thereby obtain the resin particles.

3. The resin particles producing method as claimed in claim 1, wherein the granulation prevention agent includes inorganic fine particles.

4. The resin particles producing method as claimed in claim 3, wherein the inorganic fine particles include fine particles each of which is mainly composed of silica and/or titanium oxide.

5. The resin particles producing method as claimed in claim 1, wherein when the average particle diameter of the granulation prevention agent is defined as Dc (μm) and the average particle diameter of the fine particles is defined as Dm (μm), Dc and Dm satisfy the relation: $1 \times 10^{-3} \leq Dc/Dm \leq 1 \times 10^{-1}$.

6. The resin particles producing method as claimed in claim 1, wherein an average particle diameter of the granulation prevention agent is in the range of 0.02 to 1.0 μm.

7. The resin particles producing method as claimed in claim 1, wherein when the average particle diameter of the droplets of the ejected dispersion liquid is defined as Dd (μm) and the average particle diameter of the fine particles is defined as Dm (μm), Dd and Dm satisfy the relation: $0.5 < Dm/Dd < 1.0$.

8. The resin particles producing method as claimed in claim 1, wherein in the removing the dispersion medium, the dispersion liquid is heated at a temperature which is equal to or lower than the glass transition point of the resin material constituting the fine particles.

9. The resin particles producing method as claimed in claim 1, wherein the dispersion liquid is intermittently ejected by the use of a piezoelectric pulse.

10. The resin particles producing method as claimed in claim 1, wherein the resin particles are toner particles.

11. The resin particles producing method as claimed in claim 1, wherein the resin particles are resin particles for a powdered paint.

12. Resin particles that are produced by the resin particles producing method as defined in claim 1.

13. The resin particles as claimed in claim 12, wherein the average roundness R of the resin particles which is represented by the following formula (I) is 0.95 or higher:

$$R = L_0/L_1 \qquad (I)$$

wherein $L_1$ (μm) represents the circumference of a projected image of a resin particle that is a subject of measurement, and $L_0$ (μm) represents the circumference of a perfect circle (a geometrically perfect circle) having the same area as that of the projected image of the resin particle that is a subject of measurement.

14. The resin particles as claimed in claim 13, wherein the standard deviation of average roundness among the resin particles is 0.015 or less.

15. The resin particles as claimed in claim 12, wherein the bulk density of the resin particles is equal to or more than 0.34 g/cm$^3$.

16. A resin particles producing apparatus, comprising:
    a head portion that ejects a dispersion liquid which comprises a dispersion medium and fine particles of a resin material, the fine particles being dispersed in the dispersion medium;
    a conveying portion in which the dispersion liquid ejected from the head portion in the form of droplets each of which contains two or more of the fine particles is conveyed
    and the dispersion medium is removed from the dispersion liquid to obtain resin particles which are derived from the fine particles; and
    a granulation prevention agent supply portion that supplies a granulation prevention agent for preventing or suppressing the fine particles from being agglomerated to the ejected dispersion liquid in the form of droplets while the droplets being conveyed in the conveying portion.

17. The apparatus as claimed in claim 16, wherein the conveying portion has a housing with an inner space in which the dispersion liquid, is conveyed and the dispersion medium is removed therefrom, and the granulation prevention agent supply portion supplies the granulation prevention agent in the housing.

18. The apparatus as claimed in claim 16, wherein the granulation prevention agent is injected from the granulation prevention agent supply portion toward a direction opposite to an ejecting direction of the dispersion liquid.

* * * * *